United States Patent [19]

Fiegehen et al.

[11] B 4,130,788

[45] Dec. 19, 1978

[54] NUMERICAL CONTROL SERVO SYSTEM

[75] Inventors: Allan G. Fiegehen, Orange; Robert P. Houghton, Anaheim; Cecil Earl Bradley, Alta Loma; Paul F. Richenburg, Orange, all of Calif.

[73] Assignee: General Automation, Inc., Anaheim, Calif.

[21] Appl. No.: 412,023

[22] Filed: Nov. 1, 1973

[44] Published under the second Trial Voluntary Protest Program on Apr. 6, 1976 as document No. B 412,023.

[51] Int. Cl.² ............... G05B 19/24; G05B 19/40
[52] U.S. Cl. ............... 318/574; 318/573
[58] Field of Search ............... 318/574, 573

[56] References Cited

U.S. PATENT DOCUMENTS

| 3,173,001 | 3/1965 | Evans | 235/154 |
|---|---|---|---|
| 3,422,325 | 1/1969 | Gerber et al. | 318/574 |
| 3,449,554 | 6/1969 | Kelling | 235/151.11 |
| 3,473,157 | 10/1969 | Little et al. | 318/573 X |
| 3,525,917 | 8/1970 | Leenhouts | 318/574 X |
| 3,576,981 | 5/1971 | Okamoto et al. | 318/573 X |
| 3,585,478 | 6/1971 | Leenhouts | 318/574 X |
| 3,619,755 | 11/1971 | Munro et al. | 318/574 X |
| 3,633,087 | 1/1972 | Vawter et al. | 318/574 X |
| 3,767,990 | 10/1973 | Kreithen et al. | 318/574 X |

OTHER PUBLICATIONS

"Inside the Mark Century Numerical Controls," Evans and Kelling, Control Engineering," 5/63

*Primary Examiner*—Robert K. Schaefer
*Assistant Examiner*—John J. Feldhaus
*Attorney, Agent, or Firm*—Christie, Packer & Hale

[57] ABSTRACT

An apparatus and method are disclosed for substantially improving the accuracy and surface finish quality of numerical control machine tool performance by generating velocity command signals for multiple axis drive systems based on the distance between the cutting tool and a point along the desired path, either the desired end point or a dynamic target which moves continuously along the desired cutting path ahead of the cutting tool.

14 Claims, 17 Drawing Figures

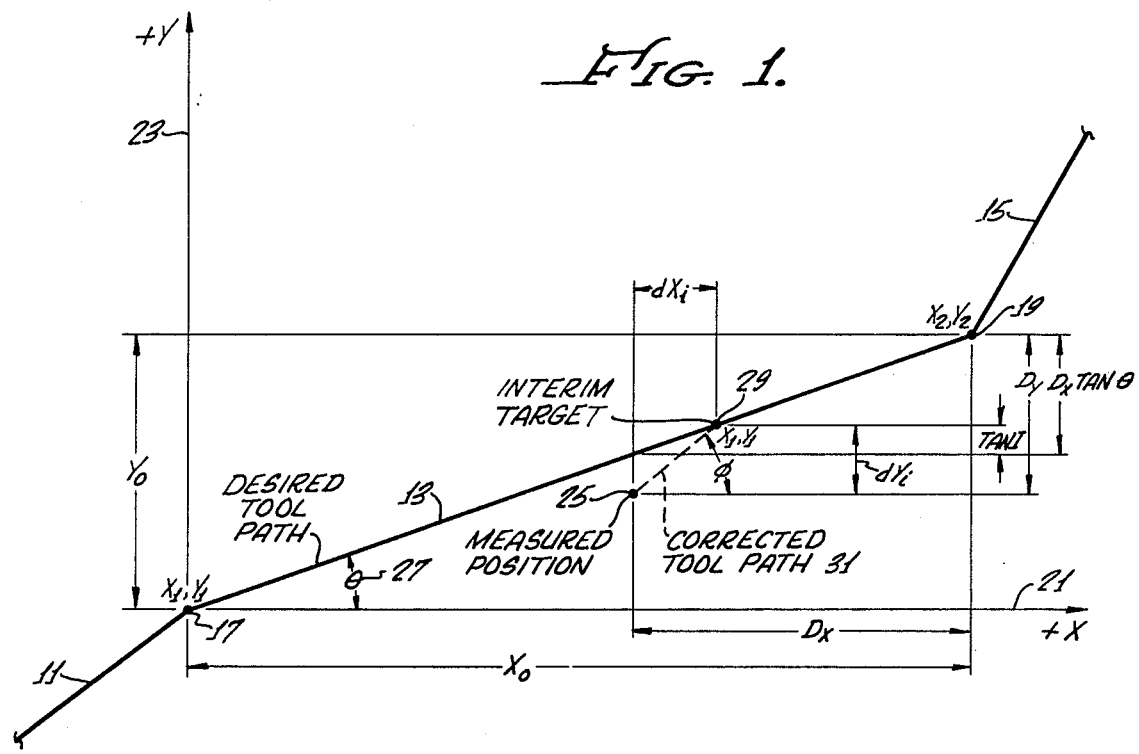
FIG. 1.
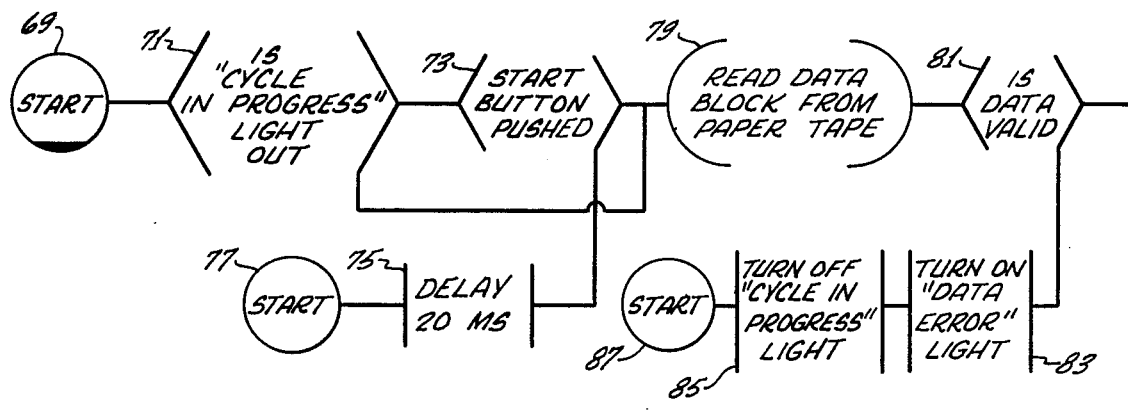
FIG. 3.
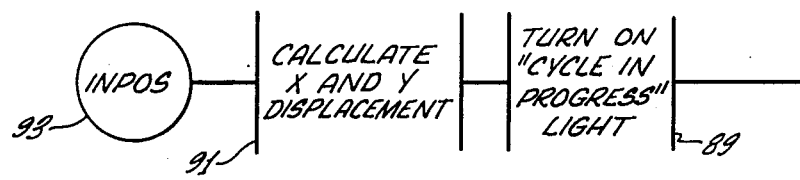

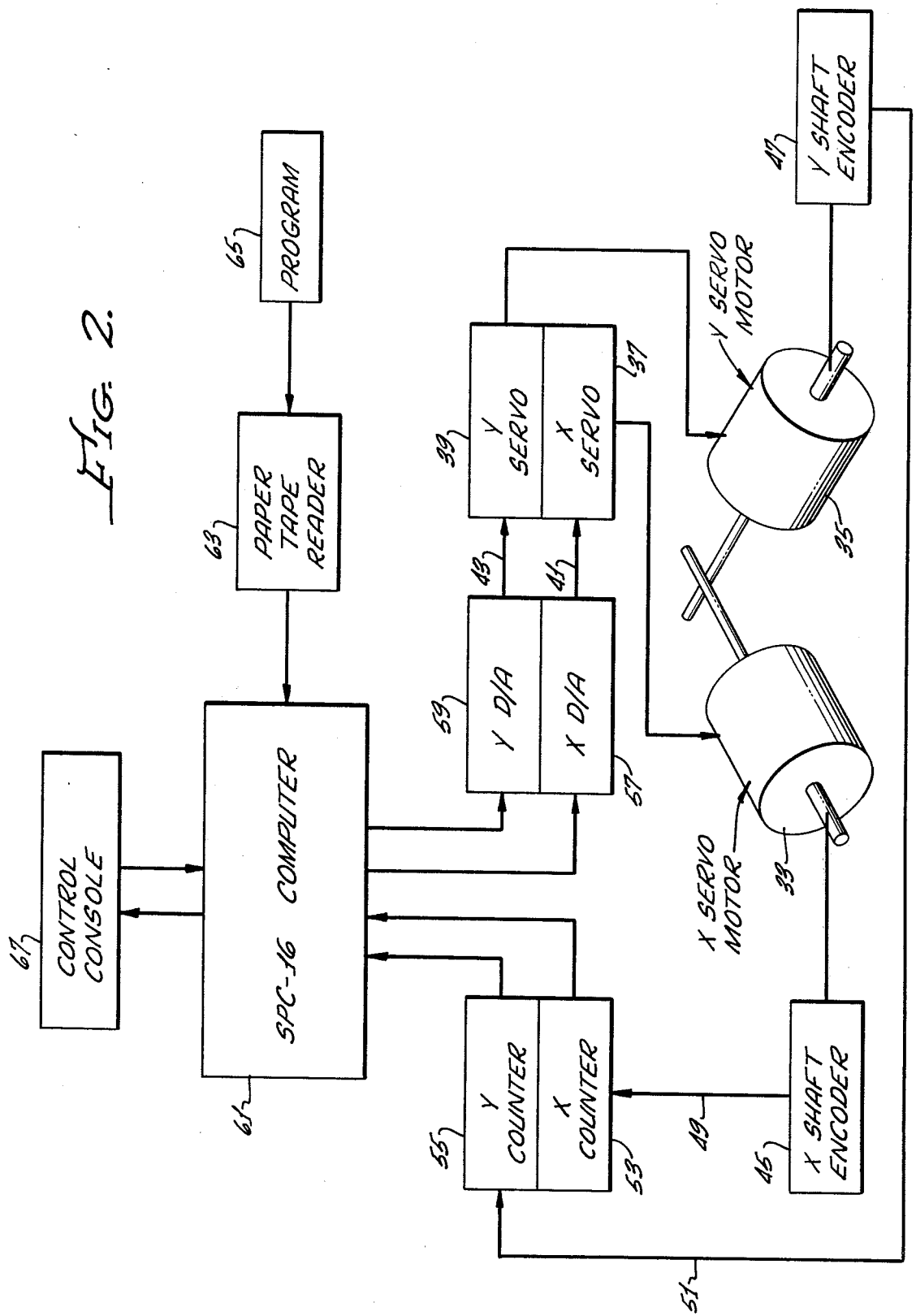

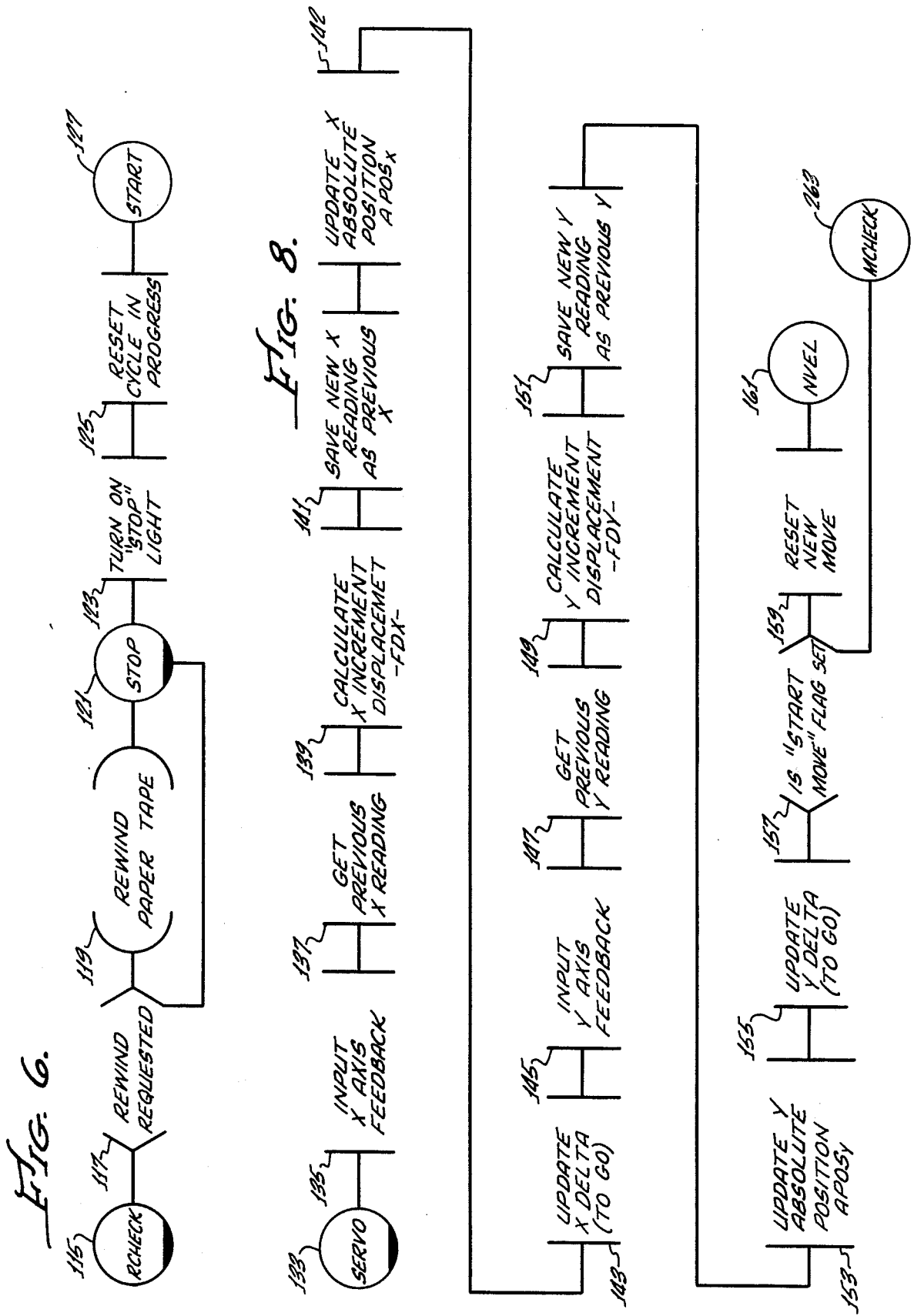

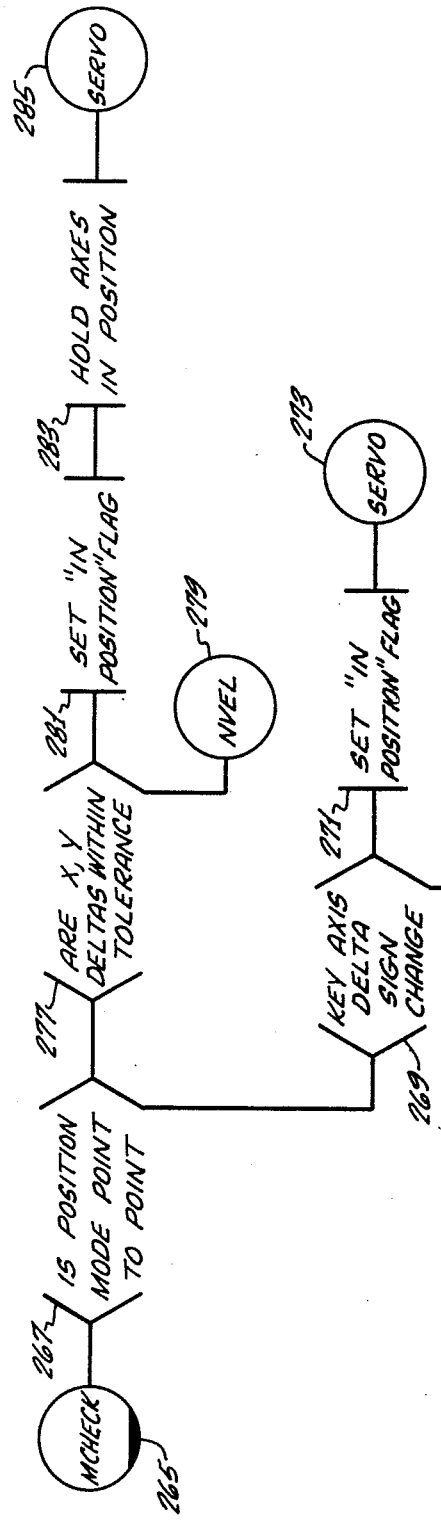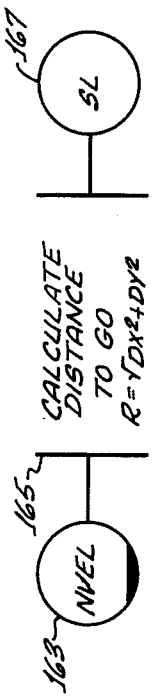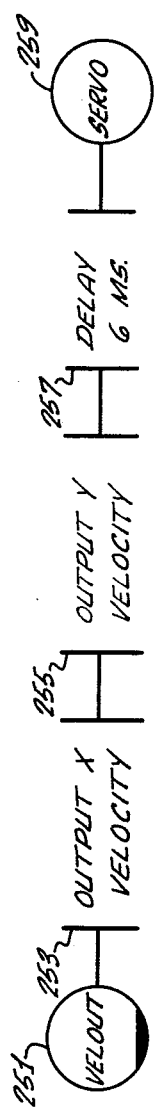

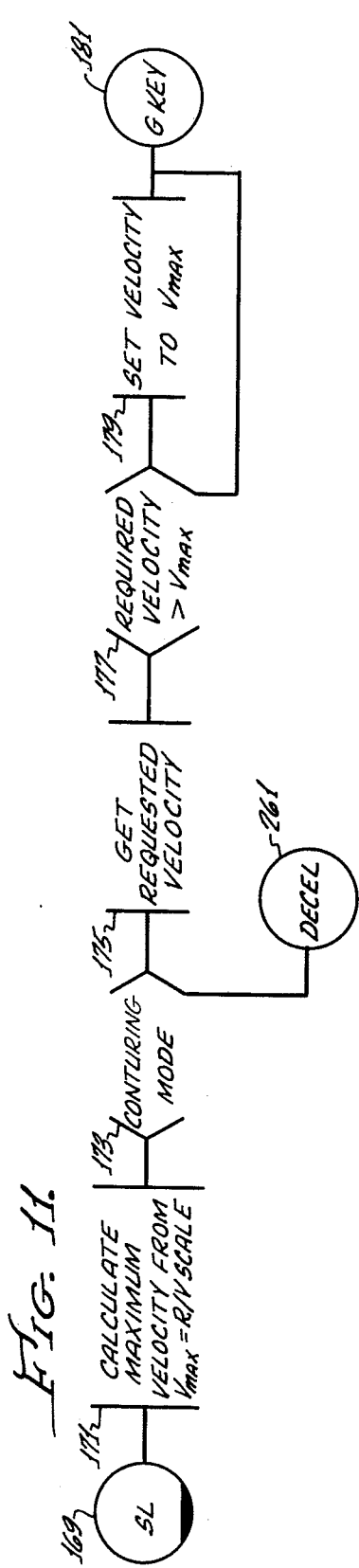
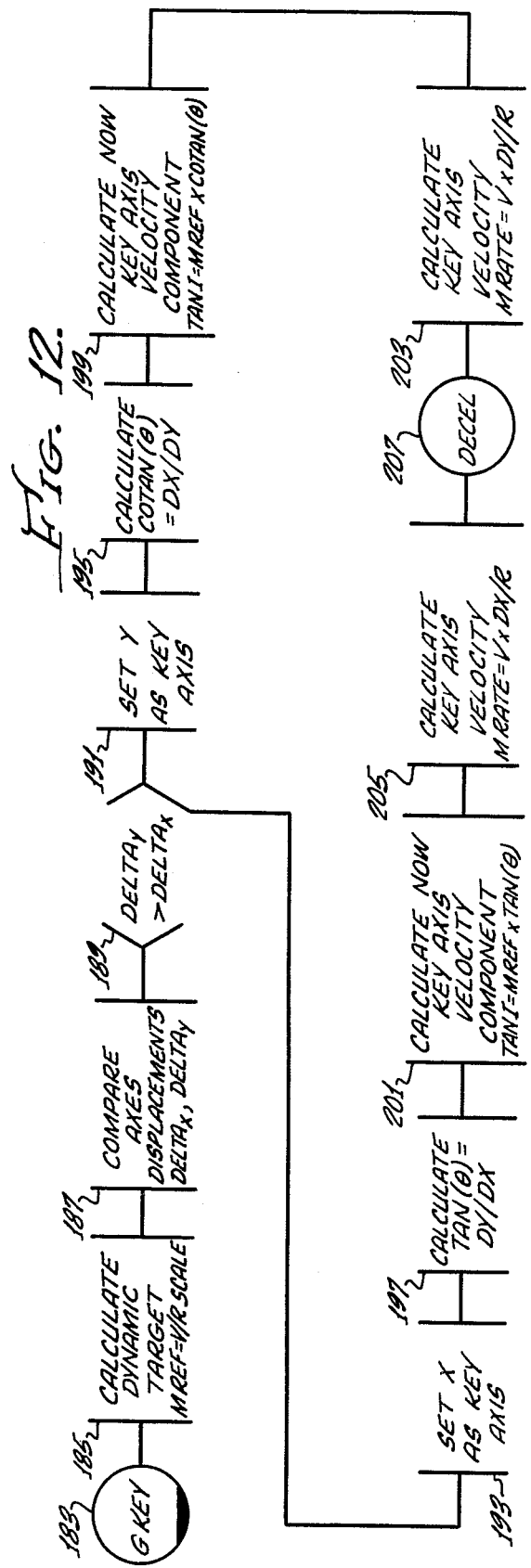
Fig. 11.
Fig. 12.

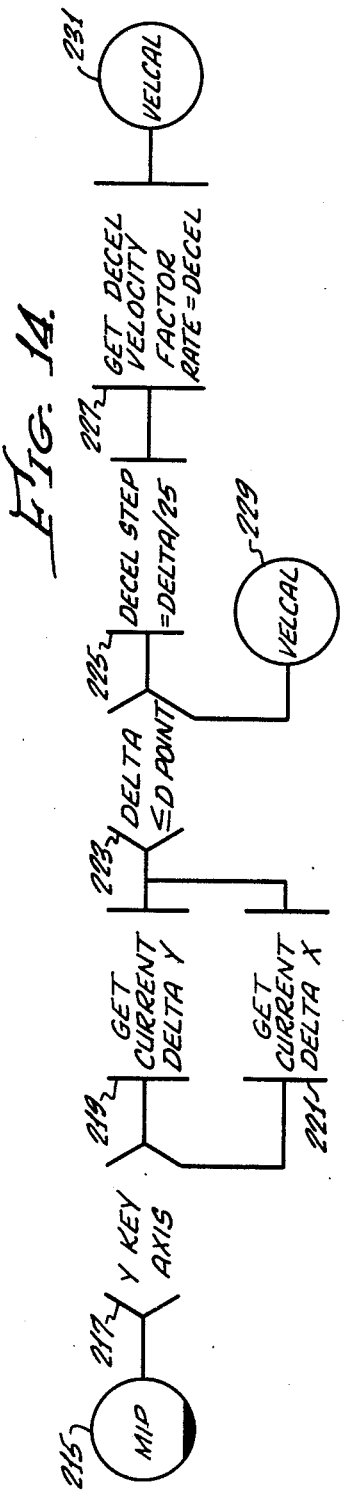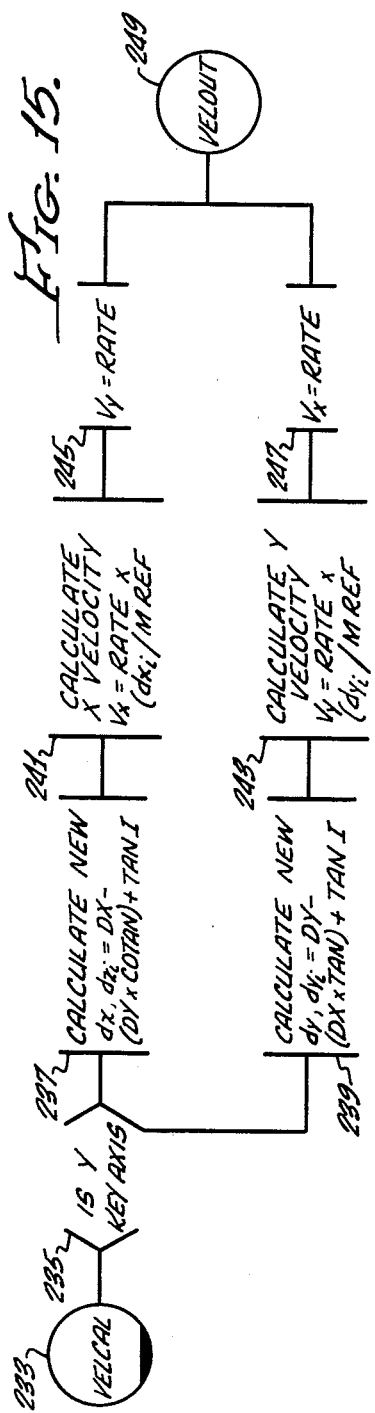

NUMERICAL CONTROL SERVO SYSTEM

BACKGROUND OF THE INVENTION

This invention relates to numerical control machine tools for cutting contours into a workpiece wherein the cutting machine includes servo motors for driving the cutting tool along at least two axes in response to velocity command signals for each axis. More specifically, this invention relates to apparatus and methods for generating such velocity command signals in response to input data defining the end points of straight line segments which are to be cut by the cutting tool, which straight line segments make up the perimeter of the desired cutting tool path. It will be understood that when curves such as circles and ellipsis are to be followed by the cutting tools, these curves will be generated as a plurality of relatively short straight line segments, the length of the line segments depending upon the radius of curvature.

The most advanced numerical control machine tools presently available for controlling the contour motion of a cutting tool generally calculate the distance between the end point of a line segment at which the tool resides at a given instant in time and the other end point of the line segment which the cutting tool is to traverse. Output velocity signals are then generated in proportion to the distances along each of the axes to be traveled toward the desired end point. In such apparatus it has been recognized that the servo systems controlling the motors for driving the cutting tool along each of the axes of the desired line segment often do not respond linearly to the velocity command signals, and the cutting tool is often driven in response to the velocity command signals along a path which is different from the desired line segment. For this reason, prior art numerical control machine tools have included monitoring devices, such as shaft encoders or resolvers, for constantly monitoring the position of the cutting tool along each of the axes to be controlled. The monitoring devices produce a signal which may be used as an error feedback signal to determine whether the cutting tool is moving along the desired path.

It is also common in such prior art systems to utilize the position feedback signal to calculate a new set of command velocity signals by determining the actual tool location and its deviation from the desired path. Thus, the command velocity signal connected to the drive motors is updated whenever the tool position deviates from the desired line segment. Thus, the command velocities will be altered to increase the driving signal for the servo motors driving the cutting tool in accordance with the deviation from the desired path.

A system such as that described above has a number of serious drawbacks. Initially, it will be immediately recognized that once the tool has deviated from the desired path, merely altering the motor drive signals in accordance with this deviation will permit the error to continue. Thus, the error is never completely eliminated.

A further deficiency of this prior art technique exists as a consequence of the practical limitations in building the control equipment. Thus, it has long been common to utilize digital shaft encoders or resolvers to constantly monitor the position of the machine cutting tool and to digitally derive the desired velocity signals for each of the servo motors. The digitally derived velocity signal must be converted, typically in a digital-to-analog converter, to an analog signal compatible with the servo motor control. Both the digital-to-analog converter and the shaft encoder or resolver therefore have the inherent limitation of digital devices that a certain minimum error signal is required to change their least significant bit. Thus for example if a shaft encoder having 14 bits were used to measure the entire range of a given axis, the smallest incremental distance required to change the least significant bit of the encoder, and thus register as an error signal, is approximately one ten thousandth of the total axis range. Similarly, if, for example, a digital-to-analog converter designed to respond to 11-bit data words is utilized, then only velocity changes which are equivalent to approximately one thousandth of the maximum velocity may be converted. While this inherent limitation in such digital circuitry appears relatively minor in significance, it is sufficient to produce a relatively rough cutting surface on the part being machined since the cutting tool will be permitted to continue along an erroneous path until the least significant ascertainable amount of error is realized in a given axis. Only then will a correction be implemented, changing the cutting path abruptly.

The problem discussed above becomes even more acute when the angle separating the desired line segment from one of the servo controlled axes becomes relatively small. It will be recognized that the error between the actual path and the desired path along an axis perpendicular to this axis, although relatively small, can be a relatively large percentage of the total distance to be moved along this perpendicular axis. Therefore, the inaccuracies which are caused by the limitation of the digital circuitry become more acute. Thus, by way of extreme example, if the distance to be moved between a pair of line segment end points along a given axis were equivalent to ten counts of the shaft encoder, it is apparent that an error signal of sufficient magnitude to make a correction will not be generated until the actual tool path is in error from the desired path by one encoder count or least resolver discriminator resolution, or one tenth of the entire distance to be moved along this particular axis. The surface finish along this axis is therefore likely to be extremely poor, and in machines of this type the surface finish will often be significantly poorer than the accuracy of the tool in reaching the desired end point.

SUMMARY OF THE INVENTION

These difficulties encountered in prior art digital numerical control machine tools are alleviated by the present invention. Fundamentally, this invention includes apparatus and methods for generating velocity command signals based not upon the distance from the present tool location to the desired tool path, but rather based upon the angular direction from the present tool location to a position ahead of the tool on the desired tool path. In addition, the present invention utilizes an interim target point which is a short distance ahead of the present actual tool location as a basis for correcting the velocity command signals. The invention also includes apparatus and methods for determining the major axis along which the line segment lies, so that all calculations may be made in accordance with the major axis, thus simplifying the calculation process.

A predetermined distance along the major axis of motion is selected in accordance with the particular characteristics of the servo system which is to be driven. This predetermined distance is utilized to specify a point on the desired line segment which will be used as an interim target. The distance to this point on the desired path along a second axis from the present location of the tool, as determined in accordance with the position feedback signal from the shaft encoders, may then be calculated. The new velocity command signals will therefore direct the servo motors toward this interim end point. The tool, however, is never allowed to reach the interim end point, since its position is selected to allow a recalculation of a new interim end point before the cutting tool moves to the first interim end point. Errors in the tool path are thus much more readily encoded and corrected, since the directional error between the present location and the interim end point will be greatly exaggerated in comparison with the directional error between the present location and the ultimate end point of the line segment. Thus, whereas in the prior art system the error equivalent to the least significant bit of the digital-to-analog converter might not be reached until the tool has progressed 90% of the distance along the line segment, at which time an exaggerated correction would be made; in the present system the error will be exaggerated by directing the system toward the interim end point and the correction will be made near the beginning of the cutting tool motion.

These and other advantages of the present invention are best understood by reference to the drawings, in which:

FIG. 1 is a diagrammatic illustration of the path of a cutting tool and the result of errors in following this path;

FIG. 2 is a schematic block diagram of the servo system and its associated control module connected to a general purpose computer designed to act as the apparatus in the preferred embodiment of the present invention;

FIGS. 3 through 16 are flow charts describing the operation of the general purpose computer of FIG. 2 in practicing the method taught by the present invention.

DETAILED DESCRIPTION OF THE PREFERRED EMBODIMENT

Figure 4:
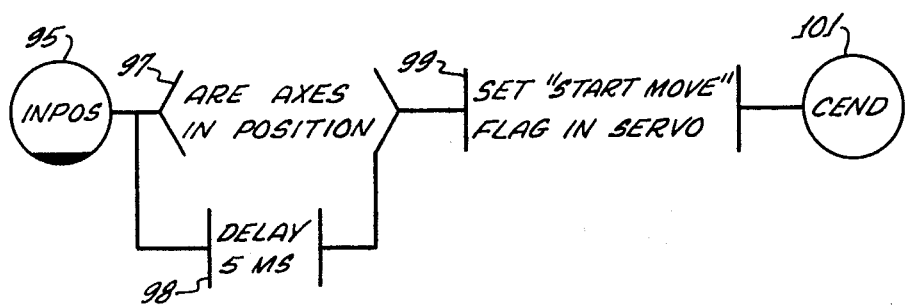
Figure 5:
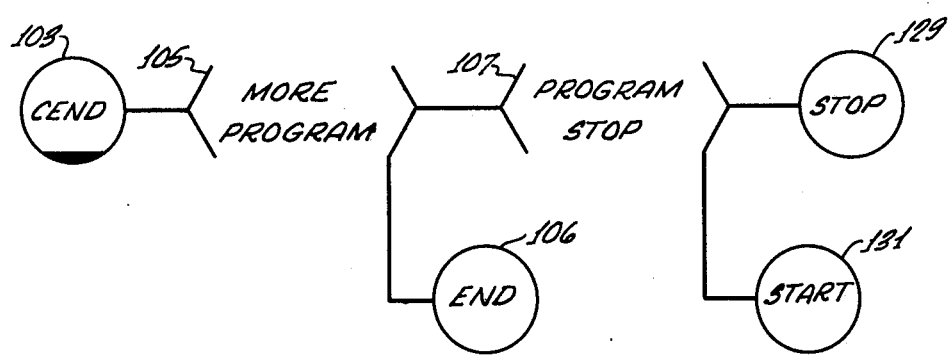
Figure 7:
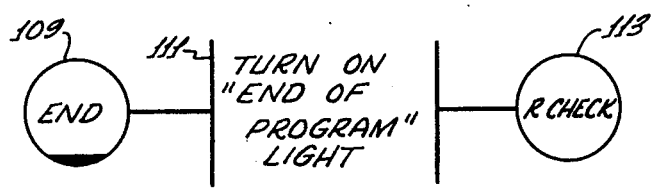

Referring initially to FIG. 1, a description will be given as to the desired tool path and the means of the present invention for implementing motion along this path. For purposes of explanation, it will be assumed that lines 11, 13 and 15 make up a portion of the perimeter of a part which is to be machined from a workpiece. The first end point 17, therefore, is the beginning point of the line segment 13. Similarly, the point 19 is the end point of this line segment, assuming that the tool is to move in a direction from line segment 11 to line segment 13 to line segment 15.

It will be assumed, for ease of explanation, that the servo system is being driven for motion along only two axes, namely an X axis 21 and a Y axis 23. The method and apparatus to be described, however, is easily implemented with the addition of a third axis, as will be readily recognized by those skilled in the art.

For ease of explanation, it will be assumed that at a first point in time the cutting tool rests at point 17, the beginning of line segment 13. At this point, as is common with prior art devices, the apparatus utilized in this invention will subtract the coordinates of the point 17 from the coordinates of the point 19, that is $X_2-X_1$ and $Y_2-Y_1$, to determine the total X distance to be moved, $X_0$, and the total Y distance to be moved, $Y_0$. The actual distance (R) between the point 17 and the point 19 may then be determined by taking the square root of the sum of $X_0^2$ and $Y_0^2$. This calculation allows the desired rate of travel (V) along line segment 13, which desired rate is a part of the input data to the equipment, may be utilized in calculating the desired velocity along the X axis 21 and the Y axis 23 in order to produce velocity command signals to the servo motors designed to move the cutting tool or the workpiece along each of these axes. Thus, the desired X axis velocity, $V_x=V(X_0/R)$, and the desired Y axis velocity, $V_y=V(Y_0/R)$.

At any particular point during the travel of the machine tool, the distance between the current tool location and the end point 19 will be designated DX, DY. Thus, at some later time when the measured position of the machine tool is at point 25, DX will be the X dimension between the point 25 and the end point 19 ($X_2-X_m$) and DY will be the difference between the measured Y coordinate of point 25 and the Y coordinate of the point 19 ($Y_2-Y_m$). Thus, for the particular tool position at point 17, $DX=X_0$ and $DY=Y_0$.

Each of the line segments 11, 13 and 15 will have a major axis, that is, the axis along which the line segment traverses the furthest. For the line segment 13, the major axis is the X axis 21, whereas, for the line segment 15, the major axis is the Y axis 23. The designation $\theta$ is utilized to indicate the angle between the desired line segment 13 and the major axis.

If it is now assumed that the tool has traversed to the point 25, and, as will be noted, has deviated from the desired line segment 13, a correction is required. As previously discussed the velocity command signals may be calculated by determining the desired velocity to move between the point 25 and the point 19, thus calculating New X and Y velocity command signals based upon the new values of DX and DY, that is, based upon the angular direction from point 25 to point 19. While this approach is within the scope of the present invention, the preferred embodiment of the present invention additionally utilizes an interim target at the point 29 and generates velocity command signals to drive the cutting tool along a corrected tool path 31 between the point 25 and the point 29. The error in the Y direction is therefore exaggerated, requiring a more substantial change in the Y command velocity so that the correction will be more accurately and smoothly accomplished.

In order to calculate the position of the interim target 29, an arbitrary X dimension $dx_i$ is utilized. This distance is selected to be short enough so that the errors will accumulate rapidly in the minor axis, but long enough to avoid oscillation of the cutting tool about the desired tool path 13. Thus, the distance $dx_i$ is selected according to the characteristics of the particular servo system to be driven. The distance $dx_i$ is most advantageously increased in proportion to the velocity which the cutting tool is to move along the path 13. Thus, if the cutting tool is directed to move rapidly along the line segment 13, the distance $dx_i$ will be relatively long, whereas, if the cutting tool is to move slowly, the distance $dx_i$ will be reduced.

As will be explained below, the encoders which monitor the measured tool position are measured at periodic time intervals, and the distance $dx_i$ is typically selected to be at least three times the distance which the tool is expected to move between each such position monitoring. This permits the errors in the minor axis to be significantly exaggerated while not permitting the tool to overcorrect before another actual position is monitored.

The distance $dx_i$ thus designates the location of the interim target at point 29. From this distance, it is possible to calculate the distance $dy_i$ so that this pair of distances may be used to determine a pair of command velocities for the X and Y axes. From FIG. 1 it is clear that $DX = X_2 - X_m$, and $DY = Y_2 - Y_m$. Therefore, $dy_i = DY - DX(\text{TAN } \theta) + dx_i(\text{TAN } \theta)$, where $\theta$, as explained previously, is the angle between the line segment 13 and the X axis.

If $dx_i$ is held constant throughout the motion from $X_1$, $Y_1$ to $X_2$, $Y_2$, then this equation becomes $dy_i = DY - DX(\text{-TAN } \theta) + \text{TAN I}$, where $\text{TAN I} = dx_i(\text{TAN } \theta)$.

The velocities of the individual axes which are required in accordance with this technique may be calculated as follows: For the velocity in the X direction, $Vx_i$, is maintained at its initial level, so that $Vx_i = Vx$. For the velocity along the minor axis, $Vy_i = Vx \text{ TAN} \phi$, where $\phi$ is the angle 33 of FIG. 1 between the corrected tool path 31 and the X axis. This equation may be written in the following form: $Vy_i = Vx(dy_i/dx_i)$. It will therefore be recognized that the approximate desired velocity along the desired path is maintained within an allowable tolerance by maintaining the velocity along the major axis as a constant, and that the velocity along the minor axis is calculated as a function of the major axis velocity.

If the motion from $X_1$, $Y_1$ to $X_2$, $Y_2$ is such that Y is the major axis, then the foregoing equations become:

$dx_i = DX - DY(\text{COTAN } \theta) + \text{TAN I}$ $\text{TAN I} = dy_i(\text{COTAN } \theta)$ $Vy_i = Vy$ $Vx_i = Vy(\text{COTAN } \theta)$ $Vx_i = Vy(dx_i/dy_i)$ It will also be noted that, if the point 25 lies along the desired tool path 13, these equations will reduce to the original equation for calculating the velocity along each of the X and Y axes. It will be noted from the foregoing equations that the velocity in the minor axis is a function of the velocity in the major axis and the ratio of $dx_i$ to $dy_i$. Since the distance along the corrected tool path 31 in the direction of the minor axis is proportionally increased by utilizing the interim target 29, the path of the machine tool will be corrected more rapidly after an error occurs, and the resulting surface finish on the workpiece will be greatly improved.

Referring now to FIG. 2, the basic system utilized in the present invention for responding to input numerical control data to produce a finished part will be described. A pair of servo motors 33 and 35 are utilized to move the machine tool along the X and Y axes, respectively. Such servo motors are commonly available commercial products, often including, in conjunction with the motors, a pair of servo control circuits 37 and 39 for driving the servo motors 33 and 35 at a predetermined speed in response to analog signals appearing on input lines 41 and 43, respectively.

Likewise well known in the prior art are a pair of shaft encoders 45 and 47 connected to the servo motors 33 and 35, respectively, for producing digital output on lines 49 and 51 whenever the machine tool driven by the servo motors 33 and 35 has progressed a predetermined distance along the X or Y axes, respectively. An X counter 53 is connected to accumulate the output of the X shaft encoder 45 to keep a current count of displacement increments so that the X counter 53 is constantly updated as the machine tool moves, and thus includes the current position of the machine tool along the X axis. Similarly, a Y counter 55 accumulates data from the Y shaft encoder 47 to constantly monitor the actual position of the machine tool along the Y axis.

An X digital-to-analog converter 57 and a Y digital-to-analog converter 59 are utilized to generate the analog signals on the lines 41 and 43 for determining the command velocity in the X servo 37 and Y servo 39, respectively. Each of the X and Y counters 53 and 55 operates as an input to a general purpose digital computer 61. The computer 61 produces output digital signals to the X and Y digital-to-analog converters 57 and 59 in accordance with the computed X and Y command velocities.

In the preferred embodiment, this general purpose computer 61 is an SPC-16-60 general purpose industrial computer manufactured by General Automation, Incorporated of Anaheim, California. This computer has 8,192 words of 16-bit core memory; power fail/autorestart feature; foreground/background capability and multiply/divide capability. The General Automation Model No. for this unit is 1604-0240. This general purpose computer is advantageously coupled to a commonly available paper tape reader 63 which is used for inputting data to the computer 61 in standard numerical control format and is also utilized to input a program diagrammatically shown at 65 into the computer 61. This program 65 will be more fully disclosed below through the explanation of a flow chart for the computer 61. The program 65 modifies the computer 61 to permit the computer 61 to properly interface with the counters 53 and 55 and the converters 57 and 59 to operate the servo system. A control console 67 is also advantageously connected to the computer 61 to permit an operator to monitor the operation of the computer 61 during the machining process.

A description of the operation of the computer 61 and its response to the counters 53 and 55 and the input data from the paper tape reader 53 to output X and Y digital velocity command signals to the converters 57 and 59 will now be explained in reference to FIGS. 3 through 16.

Referring initially to FIG. 3, the main control operations of the computer 61 will be explained. The control cycle is initiated at a step entitled start 69 which is the initial entry point into the computer program. As will become clear as this description continues, steps which are designated as circles with a darkened lower portion are program entry points. Steps designated as circles without shading are program exit points and indicate a return to a similarly designated program entry point. Steps which are enclosed within triangular brackets such as the step 71 of FIG. 3 are decision steps, a horizontal exit from such step indicating a positive answer to the enclosed decisional question and those exiting the bottom of such steps indicating a negative answer. Steps which are enclosed within parenthetical brackets, such as the step 79, are subroutine steps; and steps which are enclosed within straight brackets, such as the step 75, are operations directly performed by the routine of the flow chart.

Once the cycle has started, as indicated by the step 69, the cycle in progress light, a program flag which is, for example, a bistable element used to store the state of program progress, is monitored to determine whether a cycle is in progress. If the cycle in progress light is out, a decisional step 73 is utilized to determine if a start button on the control console 67 has been pushed. This start button on the console 67 is utilized by the machine tool operator to direct the computer 61 to proceed with a machining operation. If the start button has not been pushed, a delay of 20 milliseconds is introduced at step 75 and the program is returned, as shown in step 77, to the starting position 69. If the cycle in progress light is not out, that is, a cycle is in progress, or if the operator has pushed the start button, the program will proceed to read a block of input control data from the paper tape reader 63. This data is advantageously in common numerical control format and designates the sequence of end points to be interconnected by straight line segments as shown in FIG. 1. The data futher designates the velocity which the cutting tool should proceed along each of the line segments.

A determination is then made at step 81 whether the data is valid. This step 81 may include any common test to determine whether the data is in the proper format for machine operation. If this data is not in such proper format, the control will shift to operational step 83 wherein a data error light on the control console 67 is energized. A step 85 then turns off the cycle in progress light, explained previously, and step 87 returns the computer to its initial state at the start step 69.

If the data is determined in step 81 to be valid, the cycle in progress light, which is dependent upon a bistable memory element as explained previously, is energized in step 89, and the X and Y displacements for the line segments are calculated in step 91. These X and Y displacements, as explained previously, are the distances $X_0$ and $Y_0$ of FIG. 1 and may be determined by subtracting the X coordinates and the Y coordinates of the initial point and end point for a particular line segment, such as subtracting $X_1$ from $X_2$ and $Y_1$ from $Y_2$ for the line segment 13 of FIG. 1.

Once the X and Y displacements are calculated in step 91, they are stored in a register within the computer and control of the computer operation is transferred by means of exit point 93 and entry point 95 (FIG. 4) to a decisional step 97 for determining whether the axes are in position, that is, whether the cutting tool has arrived at one of the end points. In this example, we shall assume that the cutting tool has previously arrived at the point 17 of FIG. 1 and is prepared to begin a new line segment. The axes are therefore in position. If the axes were somewhere along a line segment between respective end points, and the answer to the decisional block 97 is therefore negative, a 5 millisecond delay would be introduced at step 98 and the decisional block 97 would again be reached. Thus, we remain at the decisional block 97 until we have reached a line segment end point.

Once we have reached an end point, a Start Move Flag, again a bistable element, is set in the servo routine, an independent computer routine which will be described in detail below. Setting of the Start Move Flag in step 99 will energize this routine and simultaneously control of the present routine will shift, by means of the exit point 101 and the entry point 103 (FIG. 5), to a decisional block 105 which inquires whether more program is available from the paper tape reader 63. If such additional program is not available, control of this program will pass by means of the exit point 106 and the entry point 109 (FIG. 7) to step 111 wherein an end of progress light, again a bistable element, will be turned on to notify the machine tool operator that the end of progress has been achieved. Thereafter, through exit point 113 and entry point 115 (FIG. 6), a determination will be made in step 117 whether rewind of the paper tape is requested by a command on the paper tape. If such rewind is requested, a common subroutine for rewinding the paper tape is utilized at step 119. Regardless of whether rewind is requested or not in step 117, control will shift through the entry point 121 to turn on a stop light, a bistable element, in step 123 to indicate that operation on the paper tape reader 63 of FIG. 2 has been completed and the cycle in progress light is reset in step 125 to indicate that the end of the machine tool cycle has been reached. At this point, the program shifts through the exit point 127 back to the entry point 69 (FIG. 3) to begin a new cycle.

Returning now to the decisional block 105 (FIG. 5), if more program was available from the paper tape reader 63 of FIG. 2, a determination is made in step 107 whether a program stop button has been pushed on the control panel 67 of FIG. 2. If this button has been pushed, the control will shift through exit point 129 and entry point 121 (FIG. 6) to complete the steps thereafter which were previously described. If the program stop button has not been pushed, the control will shift by means of exit point 131 to the starting position at step 69 (FIG. 3) to begin a new cycle.

The program which has just been described runs continuously and is used to monitor the overall progress of the equipment operation and to interface the equipment, that is, the computer 61 of FIG. 2, with the paper tape reader 63 and the control console 67. The routines which will be decribed below are used to interface a computer 61 with the X and Y counters 53 and 55 and X and Y digital-to-analog converters 57 and 59 of FIG. 2, in order to properly direct the motions of the X and Y servo motors 33 and 35 in accordance with the technique of the present invention.

Referring initially to FIG. 8, a servo routine is shown which continuously monitors the data which is fed back from the X and Y counters 53 and 55, receiving additional imput data from the supervisory program, just described, periodically, in order to calculate the desired X and Y velocity signals for moves along successive line segments.

The routine begins at an entry point 133 and immediately monitors in step 135 the X axis feedback from the X counter 53 of FIG. 2. In the present embodiment, it is assumed that the X counter 53 and the Y counter 55 of FIG. 2 are not large enough to monitor the entire translation in either the X or Y dimensions. That is, the entire accumulation of bits or pulses from the encoders 45 and 47, as the tool or workpiece traverses the entire permissible distance in either the X or Y direction, is beyond the capacity of the counters 53 and 55. Therefore the count which is stored in the counters 53 and 55 is periodically monitored to input into a register within the computer the current X or Y axis reading. Thus, at step 135, the counter 53 is monitored and its reading is placed into a New X Reading register in the computer 61. At step 137, the previous X reading which was received from the counter 53 when it was previously monitored is removed from its storage register and at step 139 the new reading is subtracted from the previous reading by subtracting the contents of the New X Reading register from the contents of the Previous X Reading register in order to calculate the displacement FDX. At step 141, the contents of the New X Reading register are shifted for storage in the Previous X Reading register so that the next incremental displacement may be calculated in the same fashion when the counter 53 is again monitored. The displacement FDX is utilized in step 142 to update a counter by adding the displacement FDX to the current counter reading to determine the absolute X position entitled $APOS_x$. At step 143 the X displacement which was calculated in step 91 of FIG. 3 and which has been stored in a storage register is updated by subtracting from the original DX the incremental displacement FDX so that an X delta register continuously stores the remaining X increment to the end point of the current line segment. This is the value DX used in the previous mathematical explanation.

At step 145 the counter 55 of FIG. 2 is monitored to input a new Y axis feedback reading into a New Y Reading storage register. A previous Y axis reading is fetched from a Previous Y Reading register at step 147 and the new and previous Y axis readings are compared in step 149, similar to step 139 for the X axis, to determine a Y incremental displacement FDY. The new reading which was monitored in step 145 is placed into the Previous Y Reading register at step 151 and the Y absolute position $ATOS_y$ and Y delta counters are each updated in steps 153 and 155, respectively. The counter utilized in step 155 maintains the current value of the unit DY which was explained in the previous mathematical explanation.

At this point a determination is made in step 157 whether the Start Move Flag has been set in step 99 of the supervisory program of FIG. 4. If the Start Move Flag is set, indicating that a new move is to begin, the Start Move Flag is reset in step 159 so that on the subsequent operations of step 157, the Start Move Flag will have been reset, indicating that a new move is no longer being initiated. Once the Start Move Flag has been reset, control is shifted through the exit point 161 and the entry point 163 (FIG. 10) to a calculation at step 165 of the total distance to go, that is, the length of the line segment 13, for example, in FIG. 1. This is calculated, as previously suggested, by taking the square root of the sum of the squares of DX which was calculated in step 143 and DY which was calculated in step 155. The distance R is stored in a storage register.

Control of the program operation now shifts through exit point 167 and entry point 169 (FIG. 11) to a calculation of the maximum velocity at step 171. This step 171 is used in the present program to scale the velocity of each of the axes so that the motion of the X and Y servo motors 33 and 35 and the resulting motion of the tool across the workpiece will be slowed if the length of the particular line segment being cut is relatively short. Thus, the factor VSCALE is a constant and VMAX will be calculated in step 171 as a factor of this constant so that, as the length R is reduced, the quantity VMAX is likewise reduced. The quantity VSCALE is a constant which is stored in a register within the computer 61 and the calculated quantity VMAX is likewise stored in register.

The next decisional step 173 determines from the original input coding from the paper tape reader 63 whether a contouring mode move has been requested. Since the present invention is directed to a contouring mode motion, that is, a motion where the particular tool path between end points along a line segment is critical, and since a contouring mode operation requires great precision, the decisional step 173 permits the tool to be moved more rapidly between such cutting operations. Thus, for example, when the cutting tool has been raised above the workpiece and is moved, only the final destination is critical. Assuming that the particular move being accomplished is a contouring mode operation, that is, the tool is cutting the workpiece, the answer to decisional step 173 will be positive and the velocity for this move which has been received from the paper tape reader 63 is placed in a convenient storage register at step 175. A determination is then made at step 177 whether the requested velocity is greater than VMAX which was calculated in step 171. If the requested velocity is greater than VMAX, the requested velocity which was stored in step 175 in a storage register is replaced by VMAX in this same velocity storage register in step 179. If the requested velocity is less than VMAX, then the requested velocity which was stored in step 175 remains in the velocity storage register since step 179 is bypassed.

Control now shifts through the exit point 181 to the entry point 183 of FIG. 12. Entry point 183 and the steps which follow are utilized to calculate the interim target and to direct the tool motion towards this interim target. The dynamic target MREF is initially calculated in step 185 by dividing the velocity which was stored in the velocity register in either step 175 or step 179 by a constant RSCALE. This permits the dynamic target, as was explained previously, to be spaced ahead of the present tool location along the major axis by a distance which is proportional to the velocity at which the cutting tool is moving. Both the constant RSCALE and the calculated MREF digital values are stored in storage registers within the computer 61. At step 187 the axes displacements which were calculated and stored in step 91 are compared, so that, in step 189, a determination can be made whether the displacement of the X or Y axis is greater, thus determining the major or key axis. If the Y displacement is greater than the X displacement, step 191 sets the Y axis as the key axis by controlling a bistable element which is used for later reference to determine the key axis. Similarly, if the X axis displacement were greater than the Y axis displacement, step 193 would set this same bistable element to indicate that the X axis is the key axis.

It will be noted from the mathematical explanation given earlier that the value of the angle theta 27 of FIG. 1, the value of TAN I and the value of the key axis velocity are each independent of the calculations which were used in calculating the corrected tool path 31 of FIG. 1. That is, each of these values may be determined at the beginning of a given line segment since they are dependent only upon the original values of DX and DY, the dynamic target distance along the major axis and the angle theta of FIG. 1. Thus, in step 195, a calculation of the cotangent of theta which is equal to DX divided by DY is conducted. This value of cotangent of theta is then stored in a storage register. Similarly, in the parallel path where X is the key axis, the tangent of theta is calculated at step 197 by dividing the initial value of DY by the initial value of DX. At step 199, the non-key axis velocity component which has been previously termed TAN I is calculated by multiplying the stored quantity MREF which is the distance of the dynamic target along the major axis by the cotangent of theta. The value of TAN I is then placed in a storage register. When X is the key axis, step 201 calculates the non-key axis velocity component TAN I by multiplying MREF by the tangent of theta. Each of these calculations corresponds precisely with the mathematical analysis which was given previously. At step 203, when the Y axis is the key axis, a calculation of the key axis velocity MRATE is made by multiplying the requested velocity which was stored in either step 175 or 179 by the ratio of the total Y displacement, DY, to the line segment length, R, calculated in step 165. This value MRATE is then stored in a storage register. Similarly, the step 205 is utilized when the X axis is the key axis for calculating MRATE as the product of the requested velocity and the ratio of the total X displacement to the actual line segment length. At the completion of one of these sequences, depending upon which of the axes is the key axis, a calculation has been made and the result stored so that the key axis velocity and the non-key axis velocity component TAN I as well as the tangent or cotangent of theta is available in proper storage registers. Control now shifts through the exit point 207 and the entry point 209 (FIG. 13) to the calculation of a deceleration point at step 211.

The deceleration point is equal to the ratio of MRATE, which is the key axis velocity, and a constant DSCALE, which is a scaling factor which varies from system to system. This deceleration point is utilized as a location at which the velocities will be reduced during the motion along a given line segment, so that the tool will not overshoot the end point. Such a deceleration factor permits the tool to be moved at maximum velocity throughout the greater part of the line segment only to be reduced in time to permit a proper slowing of the tool at the end point.

Control now shifts through the exit point 213 and the entry point 215 (FIG. 14) to a second parallel path, depending upon which axis is the key axis. This decision is made at step 217, and, if the Y axis is the key axis, the current delta Y, that is, the value DY between the current tool location and the end point, is placed in a temporary storage register at step 219. Similarly, if the X axis is the key axis, the current value of DX is stored at step 221. It should be noted that each of these values was placed in a storage register in the step 143 or the step 155 for later use and is periodically updated as previously explained.

A determination is now made in step 223 whether the value of the current delta of the key axis, either current delta Y or current delta X, is less than or equal to the value of the deceleration point which was calculated in step 211. If the current delta value is less than the deceleration point value, then the deceleration point has been reached and control is transferred to step 225 where a register entitled decel step is set to the current delta divided by 25. The deceleration velocity factor, the constant which has been stored within the computer 61, is then read and the value of MRATE, the key axis velocity which was calculated in either step 203 or step 205, is set equal to this new deceleration velocity in step 227.

If the deceleration point has not been reached, as determined in step 223, or if it had been reached and after an adjustment of the key axis velocity in step 227, control shifts through either the exit point 229 or the exit point 231 and the entry point 233 (FIG. 15) to an additional parallel path dependent upon which axis is the key axis, this determination being made in step 235. This parallel path is used to determine the non-key axis velocity in accordance with the mathematical explanation given previously.

Initially, if the Y axis is the key axis, a calculation is made at step 237 to derive the value of $dx_i$ by subtracting from the value DX calculated in step 143 the product of DY calculated in step 155 and the cotangent of theta calculated in step 195 and adding the value of TAN I calculated in step 199. Similarly, if the X axis were the key axis, step 239 would be utilized to calculate a value of $dy_i$ by subtracting from the value of DX calculated in step 155 the product of the value of DX calculated in step 143 and the tangent of theta calculated in step 197 and adding TAN I as calculated in step 201. If Y is the key axis, the non-key axis velocity component is then calculated in step 241 by multiplying the value of MRATE calculated either in step 227 or step 203 by the ratio of $dx_i$ calculated in step 237 to MREF, the dynamic target distance, calculated in step 185.

If, however, the X axis is the key axis, the non-key axis velocity is calculated in step 243 by multiplying the value of MRATE calculated in either step 227 or step 205 by the ratio of $dy_i$ calculated in step 239 to the value of MREF calculated in step 185.

Steps 245 and 247, respectively, set the key axis velocity equal to the value of MRATE calculated in step 227 if the tool has reached the deceleration point or in step 203 or 205, respectively, if the tool has not reached the deceleration point. Control is now shifted through the exit point 249 and the entry point 251 (FIG. 16) to steps 253 and 255, which output the X and Y velocity, respectively, which have been calculated in steps 241 and 245, respectively, if Y is the key axis and in steps 243 and 247, respectively, if X is the key axis. A delay is then introduced at step 257 and control is returned through the exit point 259 to the initial entry point 133 (FIG. 8) where the cycle is again initiated.

Returning now to FIG. 11, if the decision made in step 173 determines that the instruction from the paper tape reader 63 indicates a point-to-point mode motion rather than a contouring mode motion, control is shifted through the exit point 261 to the entry point 209 (FIG. 13) to initiate a series of steps which have been previously explained.

A final parallel path which exists in the computer program results from a determination in step 157 (FIG. 8) that the Start Move Flag has not been set and that on this particular cycle through the servo routine the equipment is midway through a line segment. This will cause the control of the computer operation to shift through the exit point 263 and the entry point 265 (FIG. 9) to a determination whether the mode of tool operation is point to point or contouring mode, as explained previously, at step 267. If a contouring mode operation is in progress, control is shifted to step 269 where a determination is made whether there is a change in sign in the key axis delta value. Thus, when the current delta, as set in either step 219 or step 221, depending upon the key axis, changes sign, this is an indication that a cutting tool has reached and just past the desired end point. The Axes In Position Flag explained previously in reference to step 97 is set in step 271 and control is returned to the initial input point 133 (FIG. 8) via the exit point 273. If a change in sign has not occurred in the key axis delta value, control will shift from step 269 and the exit point 275 to the routine beginning with entry point 215 (FIG. 14), explained previously.

If, at step 267, a determination is made that the position mode is point to point, a determination will be made in step 277 whether the X and Y delta values are within tolerance. Thus, in the point-to-point mode, the delta values calculated in steps 143 and 155 are monitored and the computer will continue to control machine operation by a transfer through the exit point 279 to the previously described entry point 163 to permit the tool to continue motion until the X and Y delta values are within a predetermined tolerance band around the end point. Once this position has been reached, the In Position Flag, previously described in reference to step 97, is set in step 281 and the axes are held in their present position as indicated by step 283 while control is shifted through the exit point 285 to the beginning of the servo routine at step 133 (FIG. 8).

As will be recognized from the previous description, the computer has been programmed in accordance with the preceding flow chart to operate the X and Y servo motors 33 and 35 in accordance with the mathematical formulas given previously so that, in reference to FIG. 1, the servo motor velocities are always determined by calculating a corrected tool path 31 in order to increase the error in the minor axis and thus assure that errors will not accumulate within the system without being detected.

It will also be recognized that a path correction could be made by merely setting the X and Y velocity output registers to a value proportional to DX and DY, as determined in steps 143 and 155, respectively. This would eliminate the corrected tool path to an interim target, but would correct the tool path to an angle corresponding to a line connecting the points 25 and 19 of FIG. 1.

Figure 17:
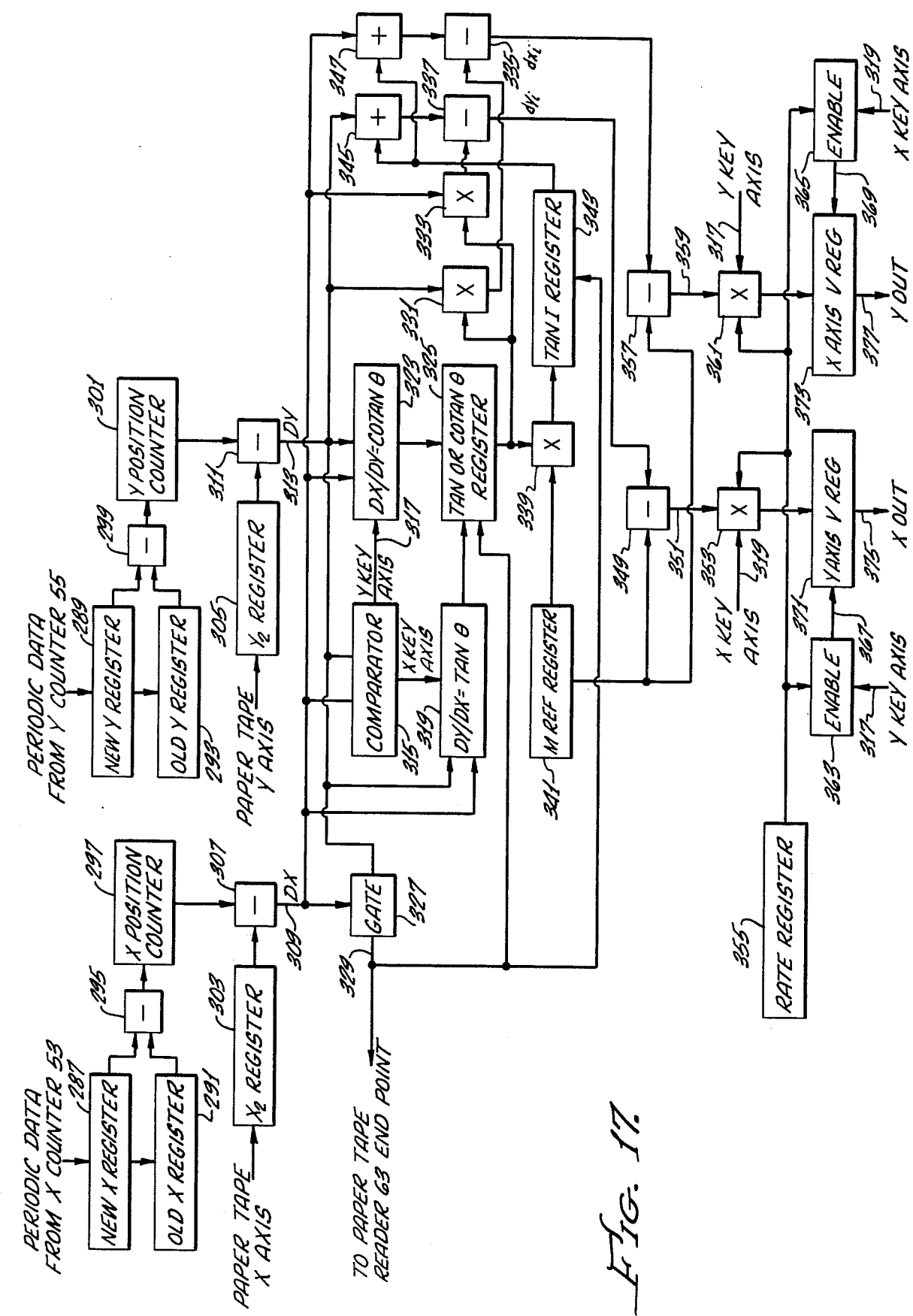
FIG. 17 is a schematic block diagram showing an implementation of the present invention utilizing a special purpose digital computer.

Referring now to FIG. 17, a second embodiment of the present invention utilizing hard wired digital components will be explained. The hard wired system shown schematically in FIG. 17 will produce substantially the same result as the general purpose computer system described previously. For convenience, however, the system illustrated in FIG. 17 predetermines a fixed velocity for tool travel along the key axis and calculates a non-key axis velocity relative to this key axis velocity to control the motion of the tool along the corrected tool path 31 of FIG. 1. Thus, the system shown in FIG. 17 does not include a RATE deceleration when the end point is approached and does not include a means for scaling the tool speed in accordance with the length of a given line segment.

Periodic data from the X and Y counters 53 and 55 of FIG. 2 is clocked into a New X register 287 and New Y register 289. These registers are common digital storage registers. Each time that a new input is clocked from either the counter 53 or the counter 55, the data previously in the storage registers 287 and 289 will shift to an additional pair of registers, Old X register 291 and Old Y register 293. Thus, it can be seen that by inputting the value in the register 287 and the register 289 to a subtracter 295, the difference between the Old X reading within the counter 53 and the new periodic reading in that counter can be determined so that the output of the subtractor 295 may be utilized to update an X position counter 297 by adding the output of the subtracter 295 to the count in the counter 297. Similarly, a subtracter 299 is connected to subtract the contents of the register 299 from the contents of the register 293 in order to update a Y position counter 301. The counters 297 and 301 therefore are periodically updated to store the absolute X and Y positions, respectively, of the cutting tool relative to the workpiece. These values are equivalent to the values stored in steps 142 and 153 of FIG. 8.

The X axis data from the paper tape reader 53 of FIG. 2 is inputted for each sequential new end point of a line segment in response to an output command which will be explained subsequently. This X input data, equivalent to the value $X_2$ of FIG. 1, is stored in a storage register 303 and similarly the Y axis terminal point data is stored in a register 305. Each time the X position counter 297 is updated in response to an output from the counter 53 of FIG. 2, a subtracter 307 outputs the difference between the new reading of the X position counter 297 and the register 303 to produce the value DX on a line 309. Similarly subtracter 311 produces the value DY on a line 313. These are the values equivalent to those which are determined in steps 143 and 155 of FIG. 8. In order to merely correct the tool path to drive the tool from its present location to the proper end point, these values DX and DY could be multiplied by a constant and utilized to drive the X and Y digital-to-analog converters 33 and 35 of FIG. 2. However, the remaining circuitry is used to produce an interim target, in accordance with the preferred embodiment of the invention.

A comparator 315, responsive to the data on lines 309 and 313, compares the values DX and DY to determine whether the X or Y axis value is larger. The comparator 315 outputs a signal on a line 317 if the value of DX is larger, that is, that the Y axis is the key axis. Alternatively, the comparator 315 outputs a signal on line 319 to indicate when the X axis is the key axis. These signals on lines 317 and 319 are utilized to enable certain other registers and calculators so that the necessary calculation can be properly conducted in accordance with the proper key axis.

Thus, for example, if the X axis is the key axis, the signal on line 319 enables a divider 321 to operate. This divider is responsive to the signals on lines 309 and 313 and divides the value DY by the value DX to produce TAN theta. This operation is equivalent to the operation of step 197 of FIG. 12. If, on the other hand, the Y axis is the key axis, the signal on line 317 enables a second dividing network 323 so that the signal on line 309 is divided by the signal on line 313 to produce a digital signal equivalent to the cotangent of theta, an operation equivalent to the operation which is accomplished in step 195 of FIG. 12. Whenever a new tangent of theta or cotangent of theta is calculated in one of the dividers 321 and 323, this new value is coupled to a tangent or cotangent theta register 325. A gate 327 is connected to each of the signals on lines 309 and 313 which produces an output signal on line 329 only when both of the signals DX and DY are zero, that is, when the end point of a line segment has been reached. This signal on the line 329 is used to enable the register 325 so that the new value of the tangent or the cotangent of theta is placed into this register 325 only at the beginning of each line segment. This assures that the division of the values of DX and DY will properly produce the tangent or cotangent of theta, which may only be accomplished, as will be noted from FIG. 1, at the beginning of the line segment.

The value stored within the register 325 is coupled to a pair of multipliers 331 and 333 to multiply the tangent and cotangent of theta by the values DY and DX on lines 313 and 319, respectively. The output digital product from the multiplier 331 is connected to a subtracter 335. Similarly, the output of the multiplier 333 is connected to a subtracter 337.

The value of the tangent or cotangent of theta in the register 325 is additionally coupled to a multiplier 339 which has as its second input the value stored in an MREF register 341. MREF, as in the preceding example of the software system, is the distance to the dynamic or interim target along the key axis and, in the system disclosed in FIG. 17, is a constant value which is placed in the torage register 341 so that it may be repeatedly outputted to the multiplier 339. The multiplier 339 outputs the product of the tangent or cotangent of theta and the value in the MREF register, which is equivalent to the value TAN I calculated in either step 199 or 201 of FIG. 12, to a TAN I register 343. The value of this TAN I register is outputted to form the first input to each of a pair of adders 345 and 347 which have the values of DX and DY on lines 309 and 313 as a second input. The output sum from these adders is applied to the subtracters 337 and 335 so that the subtracter 337 produces the value $dy_i$, equivalent to the calculation formed in step 239 of FIG. 15, and the subtracter 335 produces the value $dx_i$, equivalent to the value calculated in step 237 of FIG. 15. The value $dy_i$ from the subtracter 337 is outputted to a divider 349 for division by the quantity stored in the register 341 to produce an output on line 351 which is multiplied in a multiplier 353 by the value stored in a RATE register 355. The RATE register, similar to the MREF register 341, stores the rate of tool motion along the major or key axis for all moves to be accomplished by the system. The result of multiplying the value stored in the RATE register 355 by the digital signal on line 351 is equivalent to the calculation performed in step 243 of FIG. 15.

Similarly, the value $dx_i$ in the subtracter 335 is connected to a divider 357 for division by the value stored in the register 341. The result of this division is a digital signal on line 359 which is coupled to a multiplier 361 for multiplication by the value stored in the RATE register 355. The output of the multiplier 353 is equivalent to the Y axis velocity when the X axis is the key axis and is equivalent to the value calculated in step 243 of FIG. 15. Similarly, the output of the multiplier 361 is equal to the proper X axis velocity when the Y axis is the key axis and is therefore equivalent to the calculation carried out in step 241 of FIG. 15.

The multiplier 353 is enabled by the signal on line 319, which signal is produced by the comparator 315 to indicate that the X axis is the key axis. Thus, the multiplier 353 is allowed to function only when the X axis is the key axis. Similarly, the multiplier 361 is enabled by the signal on line 317 from the comparator 315 so it will function only when the Y axis is the key axis.

The output of the RATE register 355 is additionally coupled to a pair of enable circuits 363 and 365 which permit conduction of the digital signal in the RATE register 355 to output lines 367 and 369 only when the Y axis and the X axis, respectively, are the key axis. Thus, the enable circuit 363 permits conduction of the value from the RATE register 355 in response to the signal on line 317 and the enable circuit 365 similarly responds to the enable signal on line 319. Both the output of the multiplier 353 and the output of the enable circuit 363 are connected to a Y axis velocity register 371. This Y axis velocity register will therefore receive an input signal from the multiplier 353 whenever the X axis is the key axis and from the enable circuit 363 whenever the Y axis is the key axis. Similarly, the enable circuit 365 and the multiplier 361 are connected to an X axis velocity register 373 which receives an input signal from the multiplier 361 whenever the Y axis is the key axis and receives a signal from the enable circuit 365 whenever the X axis is the key axis. It can be seen, therefore, that the operations equivalent to those in steps 245 and 247 of FIG. 15 have been accomplished, setting the major axis velocity equal to the value stored in the RATE register 355 and setting the minor axis velocity to a percentage of the value stored in the RATE register 355, which percentage is computed in the multipliers 353 and 361. The output from the Y axis register 371 on line 375 is coupled to the Y digital-to-analog converter 59 of FIG. 2. Similarly, the output of the X axis velocity register on line 377 is coupled to the X digital-to-analog converter 57 of FIG. 2 to properly drive each of the X and Y servo motors 33 and 35.

It will be noted that the output of the gate 327 on line 329, indicating that a line segment end point has been reached, is also utilized as an input to the paper tape reader 63 to advance the paper tape reader 63 to produce new X and Y input data for the registers 303 and 305.

From the preceding explanation, it can be seen that a hard wired equivalent embodiment for conducting the computations necessary for the calculation of the corrected tool path 31 of FIG. 1 may be constructed utilizing standard digital components such as comparitors, subtractors, registers, etc., data being clocked through and timed in this hard wired equivalent by the periodic data entry from the X and Y counters 53 and 55 which must be operated in response to a system clock.

As a specific example, the present invention has been implemented on the General Automation SPC-16-60 computer. The computer program which was utilized in this exemplary embodiment is included below.

This program includes a number of capabilities in addition to its capability to produce a corrected tool path 31 of FIG. 1. Thus, for example, this program has the capability to generate circular paths in response to predetermined input data, said circular paths made up of a plurality of short straight line segments. However, the main part of this program is directly related to the present invention.

In order to utilize the following program in an actual implementation, certain other programs, available from General Automation, Incorporated of Anaheim, California, are required. The Model Numbers and titles of these program listings are given below:

| Model No. | Title |
| --- | --- |
| PMC-(PI201T) | Initialize Program |
| PMC-(PEX01) | System Executive |
| PMC-(PSB01) | System Subroutines |
| PMC-(PC201) | Console Scan Program |
| PMC-(PZ201T) | System Zeroing Program |
| PMC-(PB201T) | Machine Block Input Program |
| PMC-(PM201) | Move Parameters Program |
| PMC-(PTP01) | Paper Tape Input Program |

-continued

| Model No. | Title |
|---|---|
| PMC-(PDF01) | Data Fetch Program |
| PMC-(PL201T) | CRT Display Program |

PROGRAM NAME: 2 AXIS SERVO ROUTINE RESOLUTION 0.0001

MODEL NUMBER: PS201

```
           ASM      7
           REF      HOLDAX,SFM
           DEF      SRATIO
           DEF      DX
           REF      NKEY,F$C11,F$C10,F$D11,F$D00
           REF      F$C01
           REF      FRATE
           REF      F$M11
           REF      F$M00
           REF      F$A11
           REF      F$S11
           REF      PERIOD
           DEF      SERVO
           DEF      RAD
           DEF      RADIUS,MRPM,IPR
           DEF      TOL
           DEF      FDBK
           DEF      KEYAX
           DEF      APOS
           DEF      RPM
           REF      BRPM,BRAD
           REF      SQRT
           DEF      NDX,NDY
           DEF      CTOL
           REF      ON
           REF      SCLK
           DEF      OVER
           DEF      MREF
           REF      R
           REF      UOUT
           DEF      DISX
           REF      XC
           REF      GREQ
CFLAG      EQU      1
LIGHTS     EQU      2
COIN       EQU      4
DELTA      EQU      6
FSERV      EQU      X'C'
CIRKEY     EQU      X'20'
           PSECT
SERVO      LDR      A,COIN       GET CONSOLE
           EXBY     A            INPUT AND
           SRA      A,1          FEED-RATE-OVERRIDE
           ANDV     A,X'F'

LDV      Z,1

RBIT     2,CFLAG,Z    RESET OVERRIDE CHANGE
           LDR      B,OVER       GET PREVIOUS OVERRIDE

XORC     A,B          ANY CHANGE?
           SKZ      NOC          NO
           SBIT     2,CFLAG,Z    YES, SET CHANGE FLAG
           STR      A,OVER       SAVE OVERRIDE

NOC        EQU      $
           SBIT     7,FSERV
           SBIT     6,FSERV
```

```
        TBIT    7,LIGHTS
        SKZ     $+2
        JMP     HOLD
        RBIT    2,CFLAG     CHECK FOR START FEED HOLD
        SKZ     NFH         IF NOT
        TBIT    6,LIGHTS      FH ALREADY ON?
        SKN     NFH           YES
        LDA     APOS        CALCULATE
        LDR     B,APOS,Z    DESIRED

JSR     F$A11       POSITION
        DC      DELTA                   FOR
        STA     DPX                     AFTER FEED
        STR     B,DPX,Z

LDA     APOS+2                  HOLD
        LDR     B,APOS+2,Z

JSR     F$A11
        DC      DELTA+2
        STA     DPY
        STR     B,DPY,Z

SBIT    6,LIGHTS    TURN ON FH-LIGHT
        RBIT    7,CFLAG
        LDV     X,3         ZERO

ZERO    A           DELTAS
ZDFH    STR     A,DELTA,X   FOR
        DECR    X           HOLD
        SKP     ZDFH
NFH     EQU     $
        TBIT    6,LIGHTS
        SKN     NFHA
        TBIT    1,LIGHTS    CYCLE IN PROGRESS?
        SKN     INFEED
NFHA    RBIT    2,UOUT      NO

LDR     A,UOUT

DTOR    A,0         OUTPUT CYCLE IN PROGRESS TIMER
        LDR     A,COIN      GET CONSOLE
        ANDVC   A,X'180'    CHECK MANUAL

SKN     INFEED      IF NOT
        RTR     X,A         EXTARCT
        ANDV    X,X'F'      AXIS

SUBV    X,8         CHECK AXIS

SKZ     INFEED
        SKM     INFEED      INVALID IGNORE
        SUBVC   X,5

SKP     INFEED      INVALID
        RTR     Y,A         EXTRACT
        SRA     Y,4         JOG MODE
        ANDV    Y,X'1F'

XORV    Y,7

SKZ     INFEED      INVALID

TBIT    5,CFLAG     INCREMENT IN PROGRESS??
        SKN     INFEED      YES
        SUBVC   Y,5           CHECK INCREMENTAL

SKP     JOG         NOT INCR
        LDR     B,INCR-1,Y  GET INCREMENT

DECR    X           EXTRACT SIGN
        SRA     X,1         OF MOVE
        SKS     $+3
        CMPL    B           MINUS
```

```
         INCR    B
         SBIT    5,CFLAG         SET INCR BIT
         RBIT    0,CFLAG         RESET DB FLAG
         RTR     A,B             CONVERT
         JSR     FSC01           INCRENENT
         RBIT    0,CFLAG         RESET DB FLAG
         ADD     X,X             TO FLOAT
         STR     A,DISX,X        AND SET

STR     B,DISX+1,X      FOR MOVE

ZERO    A               ZERO
         LDV     Y,2             OTHER

SUB     Y,X             DESIRED
         STR     A,DISX,Y        DELTA

STR     A,DISX+1,Y

JMP     NVEL2
JOG      LDR     A,LOW-5,Y       GET LOW-MED-HIGH

LDR     C,OVER          GET OVERRIDE

JSR     FSM00           MULT
         SUBVC   A,2001

SKM     $+3
         LDV     A,2000

LDR     B,LOWD-5,Y      SET B = DECEL DIST PER JOG SETTING

DECR    X               CHECK
         SRA     X,1             DIRECTION
         SKR     JOG1            IF POSITIVE
         CMPL    A               NEG MOVE
         INCR    A
         CMPL    B
         INCR    B
JOG1     EQU     $
         STR     B,JADD

LDR     C,AXIS,X        GET AXIS OUT

XEC     C               MOVE AXIS
         STR     X,JAX

SBIT    6,CFLAG         SET JOG BIT
         SBIT    2,FSERV         SET JOG ADD FLAG
         ADD     X,X             MAKE INDEX AND CHECK AXIS
         SKZ     $+3             IF X
         RBIT    6,FSERV         IF Y
         JMP     $+2             RESET AXIS ON
         RBIT    7,FSERV
         ZERO    A
         STR     A,DELTA,X       ZERO DELTAS
         STR     A,DELTA+1,X
         SBIT    3,LIGHTS,Z      TURN JOG-IN-PROGRESS ON
         JSR     HOLDAX
*
* INPUT FEEDBACK AND UPDATE POSITION
*
INFEED   EQU     $
         SBIT    2,UOUT

LDR     A,UOUT          OUTPUT CYCLE IN PROGRESS TIMER

DTOR    A,0
         ZERO    X
         ZERO    Y
INAXIS   LDR     C,XIN,X         INPUT PRESENT AXIS VALUE

XEC     C
         SRC     A,12            MAKE 16 BITS
         LDR     B,FDBK,X        GET PREVIOUS VALUE
```

```
           STR     A,FDBK,X         SAVE NEW ONE

SUB     A,B              CALCULATE DISPLACEMENT
           SRA     A,4              MAKE 12 BITS
           STR     A,FDX,X

JSR     F$C01            CONVERT TO FLO PT
           STR     A,FX,Y           SAVE FLO PT OFFSET

STR     B,FX+1,Y

LDV     C,APOS

ADD     C,Y
           STR     C,DCAPOS

LDV     C,FX

ADD     C,Y
           STR     C,DCFX

JSR     F$A11            UPDATE ACTUAL POSITION
DCAPOS     DC      0
           STR     A,APOS,Y

STR     B,APOS+1,Y

LDR     A,DELTA,Y
           LDR     B,DELTA+1,Y
           JSR     F$S11            SUBTRACT CHANGE FROM DESIRED CHANGE
DCFX       DC      0
           STR     A,DELTA,Y        SAVE REQUIRED CHANGE
           STR     B,DELTA+1,Y
           JSR     F$C10            SAVE FIX DISP FOR HOLD
           STR     A,DX,X
           INCR    X                INCREMENT AXIS PTR
           ADDV    Y,2

SUBVC   Y,4              ARE ALL AXES UPDATED

SKM     INAXIS           NO
           RBIT    6,CFLAG          CHECK FOR MAN JOB
           SKZ     $+2
           JMP     SEX
           TBIT    5,CFLAG          CHECK FOR MAN INCR
           SKZ     JCHECK
           TBIT    0,CFLAG          IN POSITION?
           SKZ     MCHECK           NO
           LDR     A,COIN           CHECK
           ANDV    A,15

SUBV    A,15

SKN     HOLD             IF PUSHED
           RBIT    5,CFLAG            RESET INCR FLAG
           RBIT    3,LIGHTS,Z         TURN OFF JIP
           JMP     HOLD
           LPOOL   10
JCHECK     RBIT    2,FSERV          IS THE JOG FLAG SET
           SKZ     MCHECK           NO
           LDR     X,JAX

ADD     X,X
           ADDV    X,DELTA

STR     X,JADD1

LDR     A,OVER

LDV     C,0

JADD       EQU     $-1
           JSR     F$M00            DECEL DIST * % OVERRIDE
           JSR     F$C01
           JSR     F$A11            ADD JOG OFFSET TO DELTA
```

```
JADD1   DC      DELTA
        STR     A,0,X           SAVE DELTA
        STR     B,1,X
        JMP     NOVER           MOVE PUSH AHEAD
MCHECK  TBIT    6,LIGHTS          CHECK FEED-HOLD
        SKZ     NFH1
        TBIT    7,CFLAG         START PUSCHED?
        SKZ     HOLD            NO, CONTINUE HOLD
        RBIT    6,LIGHTS        TURN OFF FJ-LIGHT
        RBIT    2,CFLAG           TURN OFF FH-FLAG
        LDA     DPX
        LDR     B,DPX,Z         RESTORE ORIGINAL

JSR     FSS11           DESIRDE POSITION
        DC      APOS
        STR     A,DELTA
        STR     B,DELTA,Z
        LDA     DPY
        LDR     B,DPY,Z

JSR     FSS11
        DC      APOS+2
        STR     A,DELTA+2
        STR     B,DELTA+2,Z
        ZERO    A
        JMP     ZDP
NFH1    EQU     $
        TBIT    4,CFLAG         CHECK FOR MILLING
        SKN     MSERV           MILLING
        RBIT    3,CFLAG         IS THE END VECTOR FLAG SET
        SKN     NVEL            YES
        LDR     A,DELTA         POINT TO POINT
        LDR     B,DELTA+1       GET X-DELTA
        RTR     A,A             AND
        SKP     $+5               TAKE
        CMPL    A                 ABSOLUTE
        CMPL    B                   VALUE
        INCR    B
        RLK     A
        JSR     FSC11           COMPARE TO
        DC      TOL             TOLERANCE
        SKZ     $+2             IF SAME
        SKP     NOVER           IF GT
        LDR     A,DELTA+2       GET Y-DELTA
        LDR     B,DELTA+3       AND
        RTR     A,A               TAKE
        SKP     $+5               ABSOLUTE
        CMPL    A                 VALUE
        CMPL    B
        INCR    B
        RLK     A
        JSR     FSC11           COMPARE TO
        DC      TOL             TOLERANCE
        SKZ     $+2             IF SAME
        SKP     NOVER           IF GT
        SBIT    0,CFLAG         SET DB-FLAG
        RBIT    3,LIGHTS,Z
        TBIT    6,SCLK          IS START OFF

SKZ     HOLD            NO
        LDV     A,4             TURN ON START

JSR     ON
HOLD    EQU     $
        JSR     HOLDAX          HOLD AXIS
        JMP     SEX             DELAY
        LPOOL   5
*       48C8 = 200
NOVER   LDV     A,X'48C8'

STR     A,FRATE

STR     A,MAXVEL
```

```
        ZERO    A
        STR     A,FRATE,Z

STR     A,MAXVEL+1

ZDP     EQU     $
        RBIT    0,CFLAG
        LDV     X,3

NOV1    STR     A,DISX,X

DECR    X
        SKP     NOV1
        JMP     NVEL2
        LPOOL   5
*
* NEW MILLING MOVE
*
MSERV   RBIT    3,CFLAG
        SKN     NVEL            NEW MOVE ?
                                YES
*
* CHECK CROSS OVER POINT
*
CROSS   EQU     $
        LDR     X,KEYAX         GET KEY AXIS

ADD     X,X
        LDR     A,DELTA,X       GET DELTA SIGN
        LDR     B,MREF          GET KEY SIGN

XOR     A,B             CHECK FOR CHANG
        SKM     $+2             SIGN CHANGE
        JMP     MIP
        SBIT    0,CFLAG         SET DB-FLAG
        TBIT    6,SCLK          IS START OFF

SKZ     SEX1
        LDV     A,4             TURN ON START

JSR     ON
SEX1    EQU     $
        JMP     SEX             EXIT
*
* NORMALIZE RATE FOR MILLING AND DECELERATION
*
NVEL    EQU     $
        LDV     X,3

MDELT   LDR     A,NDX,X

STR     A,DISX,X

DECR    X
        SKP     MDELT
        TBIT    1,FSERV         START CIRCLE?
        SKZ     NVEL2           NO
        LDV     X,9

ZERO    B
CPAR    EQU     $
        LDR     A,XC,X          MOVE

STR     A,XCA,X           PARAMETERS
        DECR    X
        SKP     CPAR
        ZERO    A
        STR     A,CTOL
        STR     B,CTOL
        SBIT    3,CFLAG         SET START CIRCLE
NVEL2   EQU     $
        LDR     A,DELTA         ADD
        LDR     B,DELTA,Z          IN
```

```
        STR     A,DXC           SET STARTING DELTA

STR     B,DXC,Z         FOR CIRCLE

JSR     F$A11              DELTAS
        DC      DISX
        STR     A,DELTA         LEFT
        STR     B,DELTA,Z         OVER
        RTR     A,A                 FROM
        SKP     $+5                   PREVIOUS
        CMPL    A                       MOVE
        CMPL    B
        INCR    B
        RLK     A
        STA     TEMP            SAVE ABS(DELTAX)
        STR     B,TEMP,Z

LDR     A,DELTA+2
        LDR     B,DELTA+2,Z
        STR     A,DYC           SET STARTING DELTA

STR     B,DYC,Z         FOR CIRCLE

JSR     F$A11
        DC      DISY
        STR     A,DELTA+2
        STR     B,DELTA+2,Z
        RTR     A,A
        SKP     $+5
        CMPL    A
        CMPL    B
        INCR    B
        RLK     A
        JSR     F$C11           COMPARE TO ABS(DELTAY)
        DC      TEMP
        SKM     KEYX            IF X MOVE LARGER
        ADDV    A,X'100'        CALC

JSR     F$A11           LENGTH
        DC      TEMP            OF
        SUBV    A,X'100'        MOVE

STA     RAD
        STR     B,RAD,Z

CS1     EQU     $
        LDR     A,DELTA
        LDR     B,DELTA,Z
        JSR     F$D11           CALCULATE COTAN
        DC      DELTA+2
        RTR     X,Z             SET Y KEY
        JMP     SKEY
KEYX    EQU     $
        SUBV    A,X'100'        CALC

JSR     F$A11           LENGTH
        DC      TEMP            OF
        STA     RAD             MOVE
        STR     B,RAD,Z

CS2     EQU     $
        LDR     A,DELTA+2
        LDR     B,DELTA+2,Z
        JSR     F$D11           CALCULATE TAN
        DC      DELTA
        ZERO    X               SET X KEY
SKEY    STA     TAN             SAVE TAN/COTAN
        STR     B,TAN,Z

STR     X,KEYAX         SAVE KEYAY
```

```
          TBIT      4,CFLAG
          SKZ       NMAX
VELSL     EQU       $
          LDA       RAD                         GET RADIUS
          LDR       B,RAD,Z                     OR LENGTH

TBIT      1,FSERV                     CIRCLE?
          SKZ       $+5                         NO
          LDR       A,R                         YES, USE RADIUS

LDR       B,R,Z

JSR       FSD11                       CALCULATE
          DC        CSCALE                      MAX VELOCITY
          TBIT      2,FSERV,Z                   NO DECEL
          SKZ       $+3                         NO
          JSR       FSM11                       YES ALLOW
          DC        MTOL                        HIGHER VELOCITY
          JSR       FSC11                       COMPARE TO
          DC        MINMAX                      MINIMUM SCALED VELOCITY
          SKP       SKEY1                       IF GT
          LDA       MINMAX                      GET MINIMUM
          LDR       B,MINMAX,Z                  SCALED VELOCITY

SKEY1     EQU       $
          STA       MAXVEL                      SAVE
          STR       B,MAXVEL,Z

NMAX      EQU       $
          ADD       X,X
          LDR       A,DELTA,X                   SAVE SIGN OF
          STA       MREF                        KEY AXIS DELTA
          LDR       B,DELTA+1,X                 CALCULATE
          STR       B,MREF+1

LDR       A,FRATE

LDR       B,FRATE,Z

JSR       FSC11
          DC        MAXVEL
          SKM       NSCALE
          LDA       MAXVEL
          LDR       B,MAXVEL,Z

NSCALE    EQU       $
          TBIT      1,FSERV                     CIRCLE?
          SKN       $+5                         YES
          JSR       FSM11                       KEY
          DC        MREF              KEY AXIS
          JSR       FSD11
          DC        RAD
          RTR       A,A
          SKP       $+5                         VELOCITY

CMPL      A                           VECTOR
          CMPL      B
          INCR      B
          RLK       A
          STA       MRATE                       SAVE VELOCITY
          STR       B,MRATE,Z

ZERO      A                           ZERO
          STR       A,ACELCT                    ACCELERATION COUNTS

LDV       A,500                       SET FOR ACCEL

TBIT      4,CFLAG                     PTP?
          SKZ       ORIDE                       YES, NO ACCEL
          TBIT      1,FSERV
          SKN       ORIDE
          TBIT      2,FSERV,Z
          SKN       ORIDE
          STR       A,ACELCT
```

```
        JMP     ORIDE
MIP     EQU     $
        LDR     X,KEYAX         GET KEY AXIS

LDR     B,ACELCT        GET ACCEL CTS

RTR     B,B             COUNTED DOWN?
        SKZ     MIP2            YES
        SKM     MIP2            YES
        LDA     OVER
        LDR     C,FDX,X         GET LAST DISPLACEMENT

RTR     C,C             CHECK SIGN
        SKP     $+3             IF +
        CMPL    C               MAKE
        INCR    C               POS
        SUB     B,C             UPDATE CTS
        STR     B,ACELCT        SAVE

SKM     DECEL           IF COUNTED DOWN
        SRA     B,6             DIVIDE BY 64
        SUB     A,B             SUB FROM OVERRIDE
        SKM     $+2             IF LESS THAN ZERO
        SKN     $+3             IF GT ZERO
        LDV     A,1             SET TO 10%

JMP     DECEL
MIP2    EQU     $
        TBIT    2,CFLAG,Z       NEW OVERRIDE SETTING?
        SKZ     GKEY            NO
ORIDE   EQU     $
        LDV     A,10

TBIT    4,CFLAG
        SKZ     DECEL
        LDR     A,OVER          GET OVERRIDE

DECEL   EQU     $
        JSR     FSC01           CONVERT TO FP
        JSR     FSM11           OVERRIDE MILL
        DC      MRATE           VELOCITY
        JSR     FSC11           COMPARE TO MAX
        DC      MAXCNT          COUNTS
        SKM     $+4             IF LESS
        LDA     MAXCNT          GT, GET MAX
        LDR     B,MAXCNT,Z      COUNT

STA     RATE1           SAVE IN CASE
        STR     B,RATE1,Z       NO OVER CHANGE

STR     A,RATE          SAVE THE RATE

STR     B,RATE,Z

TBIT    1,FSERV
        SKN     DECEL2
        TBIT    4,CFLAG
        SKZ     DECEL2
DECEL3  EQU     $
        JSR     FSD11           CALCULATE MOVING
        DC      RSCALE          REFERENCE FROM VELOCITY
        LDR     C,MREF          SET

RTR     C,C             TO
        SKP     $+5             SIGN
        CMPL    A               OF
        CMPL    B               KEY
        INCR    B               AXIS
        RLK     A               DELTA
        STA     MREF            SAVE
        STR     B,MREF,Z

DECEL2  EQU     $
        LDA     MREF
        LDR     B,MREF,Z
```

```
        JSR     FSM11               TANGENTAL VELOCITY
        DC      TAN                 INCREMENT
        STA     TANI                SAVE
        STR     B,TANI,Z

LDR     A,RATE

LDR     B,RATE+1

JSR     FSD11               STEPS
        DC      R353
        STR     A,DSTEP             POINT

STR     B,DSTEP+1

JSR     FSM11               FROM
        DC      RES
        STR     A,DPOINT            FEED

STR     B,DPOINT+1          RATE

*       DECEL PT / DSTEP MUST NOT EXCEED 25  !!
GKEY    EQU     $
        TBIT    1,FSERV             IS A CIRCLE IN PROGRESS?
        SKZ     $+4
        TBIT    1,GREQ,Z
        SKN     CIRCLE
        TBIT    2,FSERV,Z
        SKN     VELCAL
        LDR     X,KEYAX             GET KEY

ADD     X,X                 AXIS
        LDR     A,DELTA,X           AND
        LDR     B,DELTA+1,X         CHECK
        RTR     A,A                 CHECK DIRECTION
        SKP     $+5                 IF POS
        CMPL    A                   MAKE
        CMPL    B                   NEG
        INCR    B
        RLK     A
        STR     A,TEMP

STR     B,TEMP+1

JSR     FSC11               FOR
        DC      DPOINT              DECELERATION
        SKP     VELCAL              NO DECEL
        LDR     A,TEMP              GET

LDR     B,TEMP+1            DELTA

JSR     FSD11
        DC      DSTEP
*       CONVERT TO INTEGER
        JSR     FSC10
        TBIT    4,CFLAG             PTP?
        SKZ     FULLD               YES, FULL DECEL
        SUBVC   A,4

SKP     $+3
        LDV     A,4

FULLD   EQU     $
        RTR     X,A                 GET
        LDA     RATE1               RESTORE
        STA     RATE                IN CASE
        LDA     RATE1+1             NO OVER
        STA     RATE+1              CHANGE
        LDR     A,DCURVE,X          VELOCITY

JSR     FSC01               CONVERT TO FLO PT
        JSR     FSD11               MAKE
        DC      THOU
        JSR     FSM11               TIMES RATE
        DC      RATE
        STR     A,RATE              VALUE
```

```
            STR     B,RATE+1

*
* CALCULATE NEW VELOCITIES AND OUTPUT
*
VELCAL  EQU     $
        TBIT    1,FSERV         CIRCLE?
        SKN     CIRCLE          YES
        LDR     X,KEYAX         GET KEYAXIS

RTR     X,X
        SKN     YKEY            IF YKEY
NMX     EQU     $
        LDR     A,DELTA         X-KEY
        LDR     B,DELTA+1       CALCULATE Y
        STA     FX
        JSR     F$M11           FROM:
        DC      TAN             NDY=
        STR     A,TEMP              DY

STR     B,TEMP+1            -(DX)*(TAN)

LDR     A,DELTA+2                           +X COMPONENT
        LDR     B,DELTA+3
        JSR     F$S11
        DC      TEMP
        JSR     F$A11
        DC      TANI
        STR     A,FY            SAVE SIGN OF VY

JSR     F$D11           TIMES MOVING
        DC      MREF
EDX     EQU     $
        JSR     F$M11           CALCULATE
        DC      RATE            Y FROM TAN
        JSR     F$C10           FIX
        RTR     A,A
        SKP     $+3
        CMPL    A
        INCR    A
        STR     A,TEMP+1        SAVE Y-VEL

LDR     A,RATE          GET X-VEL

LDR     B,RATE+1

JSR     F$C10           FIX
        SUBVC   A,MINVEL

SKP     $+3
        LDV     A,MINVEL

STR     A,TEMP          SAVE

JMP     CVEL            X-VEL
YKEY    EQU     $               Y-KEY
NMY     EQU     $
        LDR     A,DELTA+2       CALCULATE X
        LDR     B,DELTA+3       FROM:
        STA     FY
        JSR     F$M11           NDX=
        DC      TAN                 DX
        STR     A,TEMP              -(DY)*(COTAN)

STR     B,TEMP+1                            + Y COMPONENT

LDR     A,DELTA
        LDR     B,DELTA+1
        JSR     F$S11
        DC      TEMP
        JSR     F$A11
        DC      TANI
        STR     A,FX            SAVE SIGN OF VX
```

```
        JSR     FSD11           TIMES MOVING
        DC      MREF
EDY     EQU     $
        JSR     FSM11
        DC      RATE
        JSR     FSC10           FIX
        RTR     A,A
        SKP     $+3
        CMPL    A
        INCR    A
        STR     A,TEMP          SAVE X-VEL

LDR     A,RATE

LDR     B,RATE+1

JSR     FSC10
        SUBVC   A,MINVEL

SKP     $+3
        LDV     A,MINVEL

STR     A,TEMP+1        SAVE Y-VEL

CVEL    LDR     A,TEMP          GET X-VEL

LDR     B,TEMP+1        GET Y-VEL

SUBVC   A,2001          CHECK MAX X

SKM     $+3             IF UNDER
        LDV     A,2000          SET TO MAX

SUBVC   B,2001          CHECK MAX Y

SKM     $+3             IF UNDER
        LDV     B,2000          SET MAX Y

RTR     A,A
        SKN     $+2
        INCR    A
        LDR     C,FX            SET

RTR     C,C             VELOCITIES
        SKP     $+3             TO
        CMPL    A               SIGN
        INCR    A               OF
        RTR     B,B
        SKN     $+2
        INCR    B
        LDR     C,FY            DELTAS

RTR     C,C
        SKP     $+3
        CMPL    B
        INCR    B
        JMP     VELOUT
*
* CIRCULAR INTERPOLATION
*
CIRCLE  EQU     $
        TBIT    3,CFLAG         CIRCLE START?

SKZ     CIP             NO
        LDR     X,CIRKEY

RTR     X,X
        SKM     NXSG
        STR     X,KEYAX

ADD     X,X
        LDR     A,DELTA,X
        STA     MREF
NXSG    LDA     XCA             GET STARTING
        LDR     B,XCA,Z         X
```

```
        JSR     FSM11           TIMES
        DC      DA              DELTA THETA/2
        JSR     FSA11           PLUS
        DC      YCA             STARTING
        JSR     FSM11           Y
        DC      DA2             TIME DT
        LDR     C,DA            GET DIRECTION

RTR     C,C             CHECK CCW
        SKM     $+5             IF CW
        CMPL    A               SET TO
        CMPL    B               INVERSE
        INCR    B               OF
        RLK     A               DIRECTION
        STA     XCA2            SAVE THEORETICAL
        STR     B,XCA2,Z        DX

JSR     FSA11           ADD IN LEFT
        DC      DXC             OVER DELTA
        STA     DXC             SAVE NEW
        STR     B,DXC,Z         ACTUAL DELTA

LDA     YCA             GER STARTING
        LDR     B,YCA,Z         Y

JSR     FSM11           TIMES
        DC      DA              DELTA THETA/2
        JSR     FSS11           MINUS
        DC      XCA             STRARTING X
        JSR     FSM11           TIMES
        DC      DA2             DT
        RTR     C,C             CHECK DIRECTION
        SKM     $+5             IF CW

CMPL    A               SET TO
        CMPL    B               INVERSE
        INCR    B               OF
        RLK     A               DIRECTION
        STA     YCA2            SAVE THEORETICAL
        STR     B,YCA2,Z        DY

JSR     FSA11           ADD IN LEFT OVER
        DC      DYC             DELTA
        STA     DYC             SAVE ACTUAL
        STR     B,DYC,Z         DY

LDA     XCA2            CALCULATE
        LDR     B,XCA2,Z        NEXT THEORETICAL

JSR     FSA11           END POINT
        DC      XCA             IN X
        STA     XCA             SAVE END
        STR     B,XCA,Z         POINT FOR NEXT SEG

LDA     YCA2            CALCULATE
        LDR     B,YCA2,Z        NEXT THEORETICAL

JSR     FSA11           END POINT
        DC      YCA             IN Y
        STA     YCA             SAVE END
        STR     B,YCA,Z         PONIT

LDV     X,3             ZERO NEW

ZERO    A               SEGMENT
ZCFB    STR     A,FX,X          FEEDBACK

DECR    X
        SKP     ZCFB
CIP     EQU     $
        LDA     DXC             GET CURRENT
        LDR     B,DXC,Z         DX
```

```
        JSR     FSS11           UPDATE FROM
        DC      FX              FEEDBACK
        STA     DXC             SAVE NEW
        STR     B,DXC,Z         DX

RTR     A,A             CHECK SIGN
        SKP     $+5             IF POS
        CMPL    A               MAKE
        CMPL    B               POSITIVE
        INCR    B
        RLK     A
        STA     DAXC            SAVE ABS
        STR     B,DAXC,Z        DX

LDA     DYC             GET CURRENT
        LDR     B,DYC,Z         DY

JSR     FSS11           UPSATE FROM
        DC      FY              FEEDBACK
        STA     DYC             SAVE NEW
        STR     B,DYC,Z         DY

RTR     A,A             CHECK SIGN
        SKP     $+5             IF POS
        CMPL    A               MAKE
        CMPL    B               POS
        INCR    B
        RLK     A
        STA     DAYC            AVE ABS
        STR     B,DAYC,Z        DY

LDA     DAXC            GET CURRENT ABS
        LDR     B,DAXC,Z        SEG DX

JSR     FSC11           COMPARE TO
        DC      DAYC            ABS SEG DY
        SKM     YLNG            IF DY GT DX
        ADDV    A,X'100'        DX*2

JSR     FSA11           PLUS
        DC      DAYC            DY
        SUBV    A,X'100'        DX/2+DY02

JMP     CES             GO BACK FOR END D SEG
YLNG    SUBV    A,X'100'        CALC:

JSR     FSA11           DX/2+DY
        DC      DAYC
CES     JSR     FSC11           COPARE TO
        DC      CTOL            SEG TOL
        SKM     NXSG            FO MAKE NEW SEG
        STA     SLEN            SAVE REMAINING
        STR     B,SLEN,Z        SEG LENTTH

RBIT    3,CFLAG         START CIRCLE?
        SKZ     CIP2            NO
        SUBV    A,X'100'        YES,SET TO

STA     CTOL            MAKE HALF A SEG
        STR     B,CTOL,Z

CIP2    EQU     $
        LDA     DXC             CALC:
        LDR     B,DXC,Z         COS(DT)

JSR     FSD11
        DC      SLEN
        JSR     FSM11
        DC      RATE            TIMES RATE
        JSR     FSC10           FIX
        STA     TEMP            SAVE
        LDA     DYC             CALC:
        LDR     B,DYC,Z
```

```
          JSR    F$D11         STN(DT)
          DC     SLEN
          JSR    F$M11         TIMES RATE
          DC     RATE
          JSR    F$C10         FIX
          RTR    B,A           SAVE VY
          LDA    TEMP          GET VX
VELOUT    EQU    $
          DTOR   A,XOUT        OUTPUT VELOCITY
          DTOR   B,YOUT
SEX       EQU    $
          LDV    A,4

JSR    PERIOD
XOUT      EQU    56
YOUT      EQU    57
SPIN      EQU    X'3B'
AXIS      DTOR   A,56
          DTOR   A,57
XIN       DTIR   A,56
          DTIR   A,57
DISX      DS     2
DISY      DS     2
DPX       DS     2
DPY       DS     2
NDX       DS     2             NEW DELTA X
NDY       DS     2             NEW DELTA Y
KEYAX     DC     0             KEY AXIS FOR MOVE
MRATE     DS     2             MILL RATE FOR KEY AXIS
TAN       DS     2             TAN OF MOVE
TANI      DS     2
MREF      DS     2
APOS      DS     2             X POSITION
          DS     2             Y POSITION
FDBK      DC     0             X FEEDBACK
          DC     0             Y FEEDBACK
RPM       DS     2
RATE      DS     2             FEEDRATE
OVER      DC     10            FEEDRATE-OVERRIDE
FX        DS     2             X DISPLACEMENT
FY        DS     2             Y DISPLACEMENT
DX        DC     0             XD-FIX
DY        DC     0             YD-FIX
KLEN      DS     2
MINMAX    DC     5.0           (10 IPM)

CSCALE    DC     20.0          VELOCITY SCALE FACTOR

XCA       DS     2             X-CENTER
YCA       DS     2             Y-CENTER
DA        DS     2             ANGLE/2
DA2       DS     2
RAD       DC     0.0

DXC       DS     2
DYC       DS     2
DAXC      DS     2
DAYC      DS     2
XCA2      DS     2
YCA2      DS     2
SLEN      DS     2
MAXVEL    DC     0.0

MAXCNT    DC     2000.0        MAX CTS OUTPUT

RATE1     DS     2
MINVEL    EQU    8
TEN       DC     10.0

RSCALE    DC     10.0          MOVING REFERENCE SCALE FACTOR

TEMP      DS     2
DPOINT    DC     50.0          DECELERATION POINT COUNTS
```

```
DSTEP   DS      2                       DECELERATION STEP
ACELCT  DC      0                       ACCELERATION COUNTS
FDX     DC      0
        DC      0
DCURVE  EQU     $
        DC      2
        DC      8               2
        DC      20              3
        DC      50              4
        DC      60              5
        DC      80              6
        DC      110             7
        DC      120             8
        DC      150             9
        DC      200             10
        DC      240             11
        DC      280             12
        DC      390             13
        DC      480             14
        DC      570             15
        DC      670             16
        DC      760             17
        DC      800             18
        DC      840             19
        DC      860             20
        DC      910             21
        DC      940             22
        DC      960             23
        DC      980             24
        DC      990             25
RES     DC      25.0            RESOLUTION

R333    DC      80.0                    DECELERATION POINT SCALE FACTOR

THOU    DC      1000.0

TW5     DC      25.0

TOL     DC      4.0

MTOL    DC      20.0

CTOL    DC      10.0

INCR    DC      1                       INCREMENTAL JOG
        DC      10                      VALUES
        DC      100
        DC      1000
JINK    DC      0               INCR SAVE
JAX     DC      0               AXIS SAVE
LOW     DC      2       4 IPM
MED     DC      20      40 IPM
HIGH    DC      200     400 IPM
LOWD    DC      1       PUSH AHEADS
        DC      10
        DC      80
        END
```

PROGRAM NAME:   2 AXIS START ROUTINE

MODEL NUMBER:   PG201

```
        DEF     INPOS
        REF     OFF
        REF     FRATE
        REF     MOVE
        REF     TOL
        REF     XREQ
        REF     YREQ
        REF     SQRT
        REF     F$M11
        REF     APOS
        REF     F$A11
        REF     NDX
```

```
            REF     NDY
            REF     DELAY
            REF     ON
            REF     PERIOD
            REF     SOST
            REF     REWIND,TOL,FSD11
            REF     CTOL
            REF     PTCNT
            REF     INZ
            DEF     XC
            DEF     R
            REF     UOUT,DSI
            REF     FSC11,FSC01
            REF     ACLK
            DEF     START,GREQ,MREQ,IREQ,JREQ
            DEF     MDIS
CFLAG       EQU     1
LIGHTS      EQU     2
MSTAT       EQU     3
TCONT       EQU     5
COIN        EQU     4
FSERV       EQU     X'C'
DPTR        EQU     X'1C'
STPTR       EQU     X'1D'
            PSECT
START       EQU     $
            LDV     Z,1

TBIT    7,MSTAT             IS THIS AN MDI REQUEST
            SKN     NBLK1       YES
            TBIT    6,COIN,Z            WAIT FOR NO
            SKN     $+2
            JMP     RESTAR
            TBIT    7,CFLAG             CYCLE ON
            SKN     $+2
            JMP     RESTAR
            TBIT    6,MSTAT     IS THE PATTERN DONE
            SKZ     $+2
            RBIT    6,MSTAT             RESET THE PATTERN DONE FLAG
            TBIT    1,MSTAT     IS THE PATTERN READ
            SKN     NBLK1       YES
            LDV     A,2                 TURN ON THE PAPER TAPE PROG

JSR     ON
NBLK1       EQU     $
            TBIT    1,CFLAG             BLOCK READY
            SKN     MOUT                YES

NBLK        LDV     A,3                 NO, REQUEST

INH
            JSR     ON                  MBLK
            JSR     OFF                 TURN OFF
MOUT        EQU     $
            SBIT    7,CFLAG,Z           SET T-I-P
            RBIT    7,LIGHTS,Z          RESET TOOL CHANGE
            LDA     MREQ                GET M-CODE
            RTR     A,A                 TEST
            SKM     GOUTBB
            SUBVC   A,10                IS THIS M10

SKN     MOUT1               NO
            SBIT    3,UOUT,Z            YES

LDV     A,6                 TURN ON SCAN FOR 200 MS DELAY

JSR     ON
MOUT1       RBIT    3,UOUT,Z

RBIT    1,FSERV             RESET CIRCLE FLAG
            RBIT    2,FSERV,Z           RESET NO DECEL FLAG
            RTR     A,A                 CHECK FOR STOP
            SKN     $+2
            JMP     STOP
```

```
OPCK    DECR    A               CHECK FOR OP-STOP
        SKN     EPCK            IF NOT
        TBIT    3,LIGHTS        CHECK OP-STOP
        SKN     STOP            IF WAS PUSHED
        JMP     CM              IF NOT PUSHED
EPCK    DECR    A               CHECK FOR END-PROG
        SKN     RCK             IF MORE
PROGE   JSR     INPOS
        INCM    PTCNT           ADD ONE TO PART COUNT

SBIT    2,LIGHTS        TURN ON END OF PROG LAMP
        RBIT    1,LIGHTS        RESET CIP
        RBIT    1,CFLAG         RESET BLOCK READY
        RBIT    7,CFLAG,Z       RESET T-I-P
        LDR     A,SOST

TBIT    2,MSTAT         DID WRAP AROUND OCCUR
        SKZ     COFF1           NO
        STR     A,STPTR         RESET THE STOP PTR
        RBIT    2,MSTAT         RESET THE WRAP FLAG
        RBIT    1,MSTAT         RESET PATTERN READ
COFF1   STR     A,UPTR          RESET THE DATA POINTER
COFF    RBIT    7,CFLAG         RESET CYCLE ON
        SBIT    4,LIGHTS        SET STOP
        RBIT    1,FSERV         RESET CIRCLE FLAG
        RBIT    2,FSERV,Z       RESET NO DECEL FLAG
        RBIT    1,CFLAG
        RBIT    4,CFLAG         RESET MILLING
CM      LDV     A,X'FFFF'       NULL

STA     MREQ            M-CODE
        JMP     RESTAR          WAIT FOR RESTART
RCK     SUBVC   A,28            CHECK FOR REWIND

SKN     NXTAA
        JMP     PROGL           END-PROG

NXTAA   SUBVC   A,68            CHECK FOR M70

SKZ     M70F            IF M70 GO TO MIRROR TURN OFF
        SKM     ARNS            IF SMALLER GO AROUND
        SUBVC   A,78            CHECK FOR M80 IN P.P.

SKN     ANS             LARGER, GO AROUND
        SBIT    1,TCONT         SET FLAG-BIT FOR X-MIRROR
        JMP     MXIT
ANS     SUBVC   A,88            CHECK FOR M90

SKN     MKERR           BAD MCODE
        SBIT    2,TCONT
        JMP     MXIT
ARNS    EQU     $
        LDR     X,UOUT

SUBVC   A,11

SKP     HCK
        ANDV    X,X'500'

SUBVC   A,8

SKZ     UP+2
ARNS1   SUBVC   A,9

SKN     $+4
        ORV     X,X'1800'

JMP     $+3
        ORV     X,X'1000'

JMP     UP+2
HCK     SUBVC   A,40            CHECK FOR HEAD UP

SKN     UP              IF UP
        ORV     X,X'400'        HEAD DOWN
```

```
        JMP     UP+2            MOVE HEAD
UP      EQU     $
        ANDV    X,X'F900'       HEAD UP

JSR     INPOS
        RBIT    4,CFLAG
        LDR     B,CFLAG
        ANDV    B,X'1400'       SAVE OPERATING MODE

RBIT    1,FSERV         RESET CIRCLE FLAG
UP1     EQU     $
        STR     X,UOUT

DTOR    X,0             OUTPUT TO HEAD
        LDV     A,352           DELAY

INH
        JSR     DELAY
        LDR     A,CFLAG
        OR      A,B             RESTORE MODE
        STR     A,CFLAG
        INE
MXIT    EQU     $
        LDV     A,X'FFFF'       NULL
        STA     MREQ            M-CODE
        JMP     GOUTBB
M70F    RBIT    1,TCONT
        RBIT    2,TCONT
        JMP     GOUTBB
MKERR   SBIT    7,LIGHTS
        JMP     INZ
GOUTBB  EQU     $
        LDA     GREQ            GET G-CODE
        RTR     A,A             PTP?
        SKN     MILL            NO, MILL
        JSR     INPOS
        RBIT    1,FSERV         RESET CIRCLE
        RBIT    2,FSERV,Z       RESET NO DECEL
PTP     EQU     $
        LDV     X,3

PTP1    LDR     A,APOS,X        MOVE ACTUAL POSITION

STR     A,NDX,X

DECR    X
        SKP     PTP1
        RBIT    4,CFLAG         RESET MILLING
        JSR     MOVE            MOVE X-Y
        JSR     INPOS
        JMP     CEND
MILL    EQU     $
        SUBVC   A,5             NO DECEL REQUESTED?

SKN     CONTR           NO, REGULAR CONTURING
        SBIT    2,FSERV,Z       SET NO DECEL FLAG
        JSR     MOVE            MOVE
        JMP     CEND
CONTR   EQU     $
        RBIT    2,FSERV,Z       RESET NO DECEL FLAG
        RBIT    1,CFLAG,Z       MOVE REQUESTED?
        SKZ     CEND            NO
        DECR    A               LINEAR?
        SKZ     LINEAR          YES
        LDA     IREQ            CALCULATE
        LDR     B,IREQ,Z

RTR     A,A
        SKP     $+5
        CMPL    A
        CMPL    B
        INCR    B
        RLK     A
        STA     TEMP            FROM
        STR     B,TEMP,Z        I
```

```
        LDA      JREQ              AND
        LDR      B,JREQ,Z          J

RTR      A,A               CALC
        SKP      $+5                RADIUS
        CMPL     A                  FROM
        CMPL     B                 MAX(I,J)
        INCR     B                   +
        RLK      A                 MIN(I,J)/2
        JSR      FSC11
        DC       TEMP
        SKP      JBIG
        SUBV     A,X'100'          DIVIDE BY 2

JSR      FSA11             ADD J
        DC       TEMP
        JMP      SAVR              SAVE RADIUS
JBIG    EQU      $
        ADDV     A,X'100'          (2*I+J)/2

JSR      FSA11
        DC       TEMP
        SUBV     A,X'100'

SAVR    EQU      $
        STA      R                 SAVE RADIUS
        STR      B,R,Z

JSR      DSI               CONVERT TO
        DC       R                 UP INTEGER
        LDV      C,8               **** 8* ECH ****

ZERO     X
MCALC1  INCR     X                 DIVDE R
        SRA      B,1                BY
        SRA      A,1                TWO
        SKR      $+3               CARRY?
        ORV      B,X'8000'          YES

RTR      A,A               MSB SHIFTED OUT?
        SKN      MCALC1            NO
MCALC2  INCR     X                 DIVIDE LSB
        SRA      B,1                BY TWO
        SUBC     B,C               LESS THAN 8*ECH?
        SKP      MCALC2            NO
        SRA      X,1               YES,M/2
        RLK      X
        SUBVC    X,3

SKP      $+3               NO
        LDV      X,3

LDV      A,1

MCALC3  ADD      A,A
        DECR     X                 2**M
        SKN      MCALC3
        JSR      FSC01             FLOAT
        STA      TEMP              SAVE
        STR      B,TEMP,Z

LDV      A,X'4180'         CALC

ZERO     B                 1/2**M
        JSR      FSD11
        DC       TEMP
        STA      DA
        STR      B,DA,Z

SUBV     A,X'100'

LDR      C,GREQ            GET DIRECTION
        SUBV     C,3               SIGN

SKP      $+5
        CMPL     A                 MAKE NEG
```

```
               CMPL    B
               INCR    B
               RLK     A
               STA     DA2             SAVE ANGLE/2
               STR     B,DA2,Z

LDA     IREQ
               LDR     B,IREQ,Z

CMPL    A
               CMPL    B
               INCR    B
               RLK     A
               STA     XC              SAVE
               STR     B,XC,Z

LDA     JREQ
               LDR     B,JREQ,Z

CMPL    A
               CMPL    B
               INCR    B
               RLK     A
               STA     YC              SAVE CENTER
               STR     B,YC,Z          Y

JSR     MOVE
               JMP     CEND
LINEAR  EQU    $
               JSR     MOVE            MOVE LINEAR
CEND    EQU    $
               RBIT    7,MSTAT
               SKN     PROGE
               LDR     A,COIN          GET CONSOLE INPUT
               ANDV    A,X'180'        EXTRACT MODE

SUBV    A,X'100'        CHECK FOR SINGLE STEP

SKZ     $+2
               JMP     NBLK
STOP    RBIT   7,MSTAT
               NOP
               JSR     INPOS
EMILL   RBIT   4,CFLAG         RESET MILLING
               JMP     COFF            CYCLE OFF
RESTAR  LDV    A,5             SET FUNCTION

JSR     PERIOD          TO PERIODIC
*
*                                      USES THE A AND Y REG
*       IN POSITION ROUTINE
*
*
INPOS   EQU    $
               RTR     Y,E
               ZERO    A
               STR     A,ACLK          FORCE
               LDV     A,X'C000'       SERVO ON

JSR     DELAY   TURN OFF START
               RTRN    Y
*
MDIS    DC     0               M DISPLAY
GREQ    DC     0               G-CODE
MREQ    DC     0               M-CODE
IREQ    DC     0,0             I

JREQ    DC     0,0             J

TEMP    DS     2
XC      DS     2
YC      DS     2
DA2     DS     2
DA      DS     2
R       DS     2
        END
```

What is claimed is:

1. A digital computer circuit arranged to drive a pair of motors, said motors connected to relatively move a tool and a workpiece along two mutually perpendicular axes, said motors being responsive to velocity command digital signals generated by said circuit to relatively move said tool and workpiece along a line the end points of which are defined by input digital data relative to said mutually perpendicular axes, comprising:

means for measuring the relative position of said tool and said workpiece and for periodically producing position digital signals defining the actual relative position of said tool and workpiece along each of said perpendicular axis;

means for adding a reference digital signal defining a predetermined length along one of said perpendicular axes to said position digital signal defining the actual relative position of said tool and workpiece along said one of said perpendicular axes to produce a target digital signal defining the location of a point along said line between said end points;

means responsive to said position digital signals, said target digital signal and said input digital data for generating a distance digital signal defining the distance between said point along said line between said end points and the actual relative position of said tool and workpiece along the other of said perpendicular axes; and means for generating said velocity command signals in proportion to said reference digital signal for one of said pair of motors and in proportion to said distance digital signal for the other of said pair of motors.

2. A digital computer circuit as defined in claim 1 additionally comprising:

means for generating said reference digital signal defining a predetermined length in proportion to the velocity of said tool relative said workpiece.

3. A digital computer circuit as defined in claim 1 additionally comprising:

means for generating said reference digital signal defining a predetermined length in proportion to the length of said line.

4. A digital computer circuit as defined in claim 1 additionally comprising:

means for reducing said velocity command signals when said tool is within a predetermined distance of one of the end points of said line.

5. A digital computer circuit as defined in claim 1 additionally comprising:

means for comparing the component distances of said line along each of said axes to generate a signal defining a major axis of said line; and means responsive to said signal defining a major axis for selecting said one of said perpendicular axes.

6. A multiple axis digital tool positioning system for moving a tool relative to a workpiece along a predetermined straight line path between end points which are identified by input data, comprising:

a plurality of motor means, one of said motor means connected to move said tool relative to said workpiece in each of said multiple axes;

means for measuring the relative position of said tool and said workpiece and for producing position signals defining the position of said tool relative to said workpiece along each of said multiple axes;

means for generating signals identifying the position of an interim point along said straight line path between the position of said tool and one of said end points, said interim point being a predetermined distance along said straight line path ahead of said position of said tool;

means responsive to said position signals and to said signals identifying the position of an interim point for generating velocity command signals for moving said tool toward said interim point;

means for connecting said velocity command signals to said motor means;

means for comparing the component of said straight line path along each of said multiple axes to produce signals defining a major axis of said straight line path; and said means for generating identifying signals being responsive to said comparing means to generate a displacement signal defining the position of said interim point along said major axis.

7. A multiple axis digital tool positioning system for moving a tool relative to a workpiece along a predetermined straight line path between end points which are identified by input data, comprising:

a plurality of motor means, one of said motor means connected to move said tool relative to said workpiece in each of said multiple axes;

means for measuring the relative position of said tool and said workpiece and for producing position signals defining the position of said tool relative to said workpiece along each of said multiple axes;

means for generating signals identifying the position of an interim point along said straight line path between the position of said tool and one of said end points, said interim point being a predetermined distance along said straight line path ahead of said position of said tool;

means responsive to said position signals and to said signals identifying the position of an interim point for generating velocity command signals for moving said tool toward said interim point;

means for connecting said velocity command signals to said motor means;

said means for generating identifying signals being responsive to said position signals for generating signals identifying the position of an interim point spaced a predetermined distance from said tool along one of said multiple axes.

8. A method of using an electronic circuit for driving the servo motors which move a machining tool along a straight line path to an end point defined by digital input data signals to said circuit, said circuit including sensors for measuring actual tool position and position feedback circuits for monitoring the actual position of said machining tool, said servo motors being subject to nonlinearities which cause said machining tool to deviate from said straight line path, comprising:

periodically generating target data signals in response to said digital input data signals and said position feedback circuits, said target signals defining target points on said straight line path between said actual machining tool position and said end point said target points preceding said actual machining tool position along said straight line path;

generating distance signals in response to said target data signals and said position feedback circuits, said distance signals defining the distance between said actual position of said machining tool and said target point;

generating velocity command signals proportional to said distance signals; and driving said servo motors in response to said velocity command signals.

9. A method of using an electronic circuit for driving servo motors as defined in claim 8 wherein said servo motors and position feedback circuits are arranged to move and monitor said machine tool along two mutually perpendicular axes, additionally comprising:

comparing the component of said straight line path along each of said mutually perpendicular axes to produce a digital signal defining the major axis of said straight line path; and determining the position of said target points by adding a signal defining a predetermined length to the signal produced by the position feedback circuit monitoring movement along said major axis.

10. A method of using an electronic circuit for driving servo motors as defined in claim 8 additionally comprising:

generating second distance signals in response to said position feedback circuits and said digital input data, said second distance signals defining the distance between said actual position of said machining tool and said end point; and reducing the level of said velocity command signals in response to a predetermined value of said second distance signals.

11. A method of using an electronic circuit for driving servo motors as defined in claim 8 additionally comprising:

generating signals defining the length of said straight line path; and scaling said velocity command signals in proportion to said signals defining the length of said path.

12. A method of using an electronic circuit for driving servo motors as defined in claim 8, additionally comprising:

scaling said target data signals in response to the level of said velocity command signals.

13. Apparatus for driving a cutting tool in a straight line relative a workpiece to be cut in more than one axis from a first location relative the workpiece at which the tool lies to a second location in response to input data signals defining said second location, comprising:

means for driving said tool relative said workpiece;

means for periodically monitoring the actual location of said tool relative to said workpiece to produce position signals;

means for periodically producing distance data signals in response to said position signals and said input data signals, said distance data signals defining the distance between said actual location and an interim point along said straight line between said actual location and said second location, said interim point lying ahead of said actual location;

means responsive to said distance data signals for energizing said driving means;

means responsive to said position signals and said input data signals for producing second distance data signals defining the distance between said actual location and said second location; and means responsive to said second distance data signals for reducing the speed of said driving means.

14. A digital computer circuit arranged to drive a pair of motors, said motors connected to relatively move a tool and a workpiece along two mutually perpendicular axes, said motors being responsive to velocity command digital signals generated by said circuit to relatively move said tool and workpiece along a line the end points of which are defined by input digital data relative to said mutually perpendicular axes, comprising:

first register means for storing said input digital data;

encoder means connected to said motors for producing position data signals defining the actual relative position of said tool and workpiece along each of said perpendicular axes;

second register means connected to said encoder means for storing said position data signals;

third register means storing a constant target reference signal;

a comparator circuit connected to said second register for producing major axis data signals by comparing the actual relative position of said tool and workpiece along each of said perpendicular axes;

fourth register means connected to said comparator circuit for storing said major axis data signals;

a first subtracter circuit connected to said first and second register means for producing difference signals defining the distance between said actual relative position of said tool and said workpiece and one of said end points along each of said axes;

a divider circuit connected to said first subtracter circuit for generating tangent;

signals defining the proportion of said difference signals along each of said axes;

fifth register means connected to said divider circuit for storing said tangent signals;

a first multiplier circuit connected to multiply the contents of said third register by the contents of said fifth register to produce a first product signal;

sixth register means connected to said first multiplier circuit for storing said first product signal;

an adder circuit connected to add the contents of said sixth register and said difference signals produced by said first subtracter circuit for producing a sum signal;

a second multiplier circuit connected to said fifth register and said first subtracter circuit for multiplying the contents thereof to produce a second product signal;

a second subtracter circuit connected to said second multiplier circuit and said adder circuit to subtract said second product signal from said sum signal to produce a second difference signal;

a divider circuit connected to divide said second difference signal from said second subtracter circuit by the contents of said third register to produce a division signal;

seventh register means storing a constant rate signal;

a third multiplier circuit connected to multiply said division signal by the contents of said seventh register means to produce a third product signal;

means connected to said seventh register for driving one of said pair of motors in proportion to the signal contents of said seventh register; and means connected to said third multiplier circuit for driving the other one of said pair of motors in proportion to said third product signal.

* * * * *